(12) United States Patent
Higley et al.

(10) Patent No.: US 12,541,063 B2
(45) Date of Patent: Feb. 3, 2026

(54) FERRULE HOLDER FOR MINIATURE MT FERRULE AND ADAPTER INTERFACE FOR MATING WITH FIBER OPTIC CONNECTORS

(71) Applicant: US Conec Ltd., Hickory, NC (US)

(72) Inventors: Jason Higley, Hickory, NC (US); Darrell R. Childers, Hickory, NC (US)

(73) Assignee: US Conec Ltd., Hickory, NC (US)

( * ) Notice: Subject to any disclaimer, the term of this patent is extended or adjusted under 35 U.S.C. 154(b) by 272 days.

(21) Appl. No.: 18/552,182

(22) PCT Filed: Apr. 3, 2022

(86) PCT No.: PCT/US2022/023220
§ 371 (c)(1),
(2) Date: Sep. 24, 2023

(87) PCT Pub. No.: WO2022/212935
PCT Pub. Date: Oct. 6, 2022

(65) Prior Publication Data
US 2024/0168240 A1 May 23, 2024

Related U.S. Application Data

(60) Provisional application No. 63/170,092, filed on Apr. 2, 2021.

(51) Int. Cl.
*G02B 6/38* (2006.01)
*G02B 6/40* (2006.01)
(52) U.S. Cl.
CPC ......... *G02B 6/3882* (2013.01); *G02B 6/3825* (2013.01); *G02B 6/3831* (2013.01);
(Continued)

(58) Field of Classification Search
CPC .. G02B 6/3821; G02B 6/3825; G02B 6/3831; G02B 6/3851; G02B 6/3881;
(Continued)

(56) References Cited

U.S. PATENT DOCUMENTS 7,651,361 B2 * 1/2010 Henry ................ H01R 13/6335
439/352
7,841,778 B2 11/2010 Nishimura et al.
(Continued)

OTHER PUBLICATIONS

International Search Report; Jul. 7, 2022; 5 pages.
(Continued)

*Primary Examiner* — Ryan A Lepisto
(74) *Attorney, Agent, or Firm* — Michael L. Leetzow PLLC; Shubhrangshu Sengupta

(57) ABSTRACT

An adapter to mate fiber optic ferrules to respective fiber optic ferrules in a fiber optic connector housing includes a main body having ferrule-side openings and connector-side openings to receive the fiber optic connectors. The adapter includes columns that extend between a top side and a bottom side of the main body, a plurality of triggers attached to the adapter, each of the plurality of triggers having a pair of trigger legs, the trigger legs positioned inside respective columns on opposing sides. There is also a holder extension groove oriented longitudinally in each column and configured to receive a holder extension of a fiber optic ferrule holder and a pair of ferrule stop pedestals on each column on opposite sides of each holder extension groove configured to seat the fiber optic ferrule when the fiber optic ferrule holder is fully inserted into the adapter.

15 Claims, 42 Drawing Sheets

(52) U.S. Cl.
CPC ......... *G02B 6/3881* (2013.01); *G02B 6/3885* (2013.01); *G02B 6/3893* (2013.01); *G02B 6/406* (2013.01); *G02B 6/3821* (2013.01); *G02B 6/3851* (2013.01)

(58) Field of Classification Search
CPC .. G02B 6/3882; G02B 6/3885; G02B 6/3893; G02B 6/406
See application file for complete search history.

(56) References Cited

U.S. PATENT DOCUMENTS

| | | | | |
|---|---|---|---|---|
| 9,423,573 | B2* | 8/2016 | Tseng | G02B 6/3893 |
| 9,857,538 | B2* | 1/2018 | Nguyen | G02B 6/3881 |
| 10,281,668 | B2 | 5/2019 | Takano et al. | |
| 10,678,000 | B2* | 6/2020 | Takano | G02B 6/3893 |
| 10,725,248 | B2* | 7/2020 | Wong | G02B 6/3879 |
| 10,996,406 | B2 | 5/2021 | Smith et al. | |
| 11,137,554 | B2* | 10/2021 | Sashida | G02B 6/3893 |
| 11,353,664 | B1 | 6/2022 | Wong | |
| 11,914,195 | B2 | 2/2024 | Higley et al. | |
| 2014/0241689 | A1* | 8/2014 | Bradley | G02B 6/44528 385/135 |
| 2016/0178855 | A1 | 6/2016 | Tseng | |
| 2018/0259717 | A1* | 9/2018 | Takano | G02B 6/389 |
| 2019/0271816 | A1 | 9/2019 | Wong et al. | |
| 2019/0278028 | A1* | 9/2019 | Higley | G02B 6/3897 |
| 2021/0026083 | A1 | 1/2021 | Iizumi et al. | |
| 2023/0091327 | A1 | 3/2023 | Kurtz et al. | |
| 2023/0244038 | A1* | 8/2023 | Higley | G02B 6/406 385/136 |

OTHER PUBLICATIONS

Written Opinion of the International Searching Authority; Jul. 7, 2022; 7 pages.

International Preliminary Report on Patentability; Oct. 3, 2023; 7 pages.

* cited by examiner

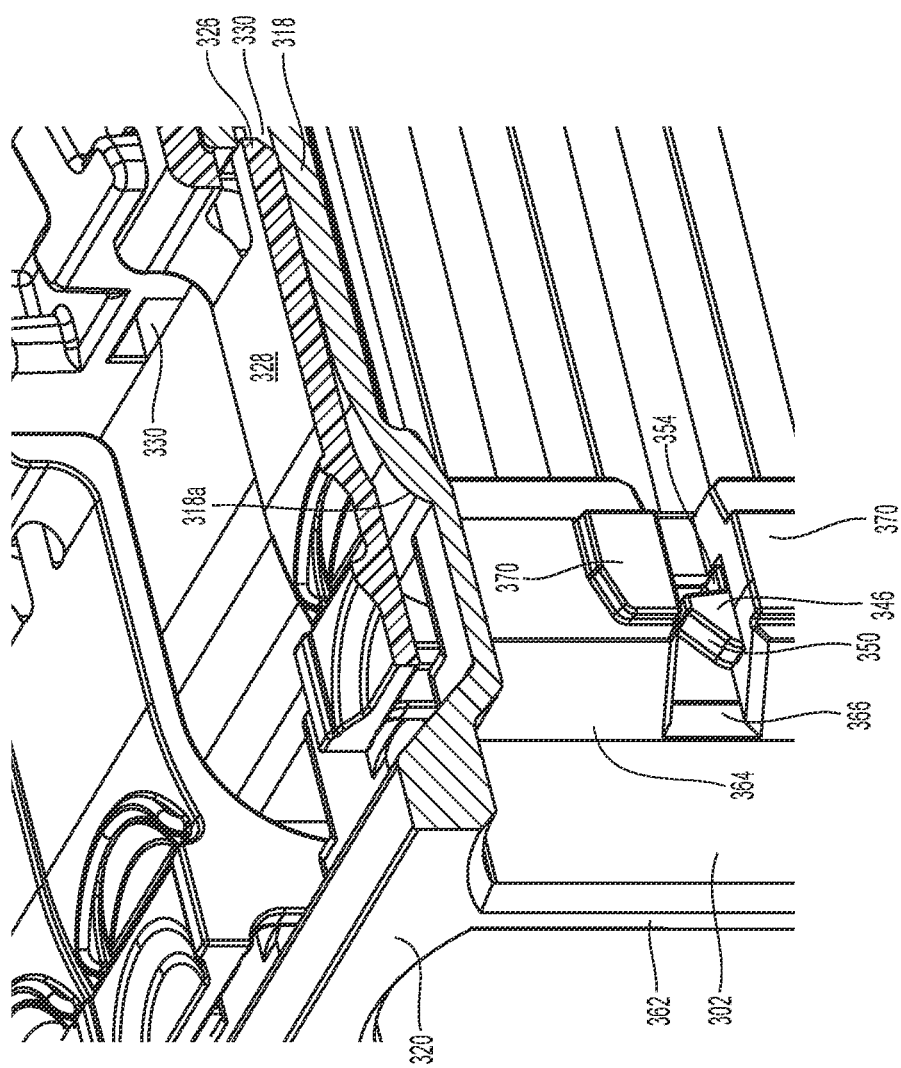

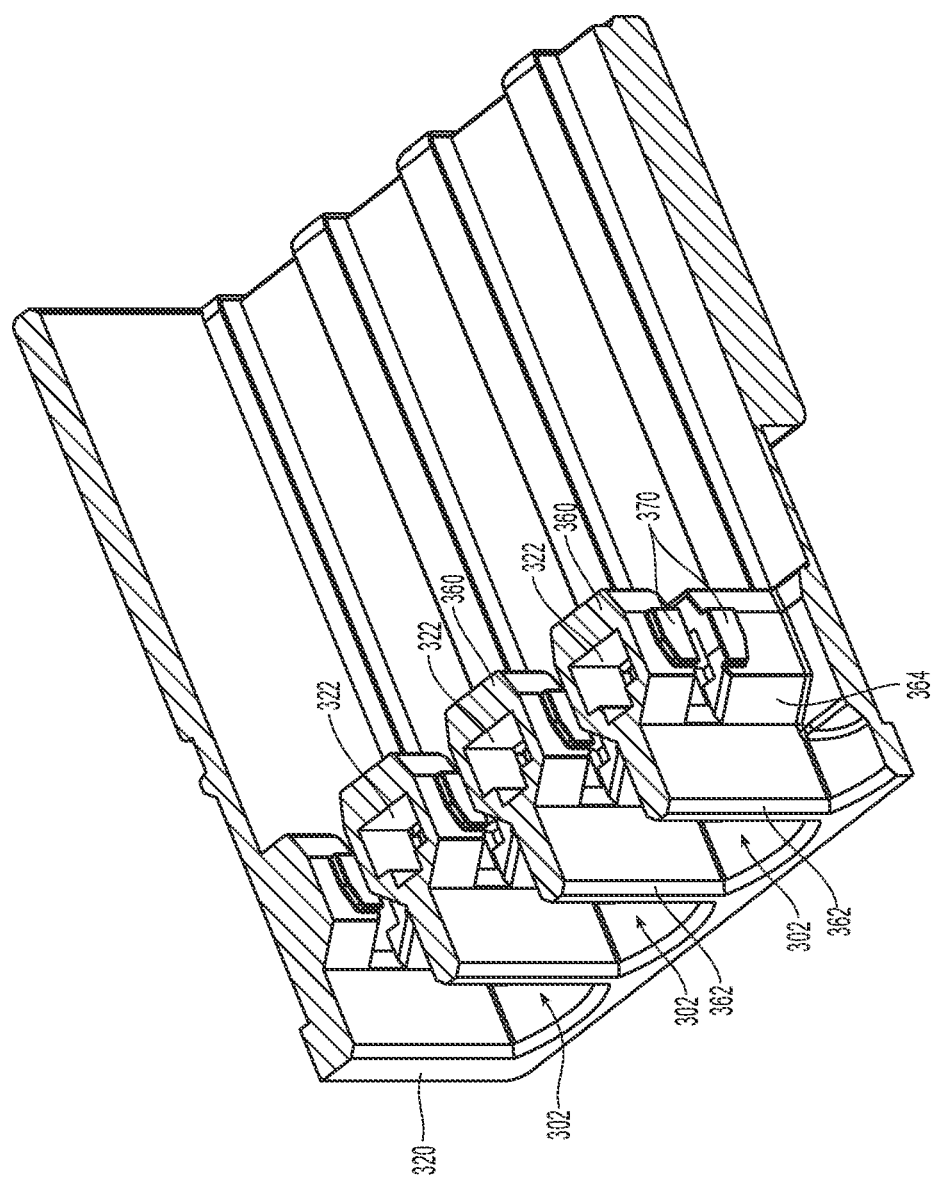

FERRULE HOLDER FOR MINIATURE MT FERRULE AND ADAPTER INTERFACE FOR MATING WITH FIBER OPTIC CONNECTORS

REFERENCE TO RELATED CASE

This application claims priority under 35 U.S.C. § 119 (e) to U.S. provisional application No. 63/170,092 filed on Apr. 2, 2021, the contents of which are hereby incorporated by reference in their entirety.

BACKGROUND OF THE INVENTION

The miniature MT ferrule was introduced by the Applicant in response to growing high density connector requirements per various high density standards being developed (e.g., QSFP-DD). The miniature MT ferrule was disclosed by the Applicant in the Application No. PCT/US21/28919 filed Apr. 23, 2021, and is significantly smaller than the conventional MT ferrules used in the fiber optic connector industry. The fiber optic ferrules have dimensions of 1.25 mm in height, 4 mm in length, and a width of 6.4 mm. Applicant has also disclosed a connector housing for this miniature MT ferrule in the Application No. PCT/US21/28925 filed Apr. 23, 2021. Current high density format applications are directed to connecting two optical connectors in that format from each side of an adapter conforming to such a format or footprint. There is no arrangement currently available in the art that mates the miniature MT ferrule directly to a connector (with a housing having a mating miniature MT ferrule within it). An angled-polished end face on the miniature MT ferrule adds another level of complexity to this problem of mating with the fiber optic connector, as fiber polarity has to be taken into account too.

As on-board applications develop, Applicant has identified a need for directly mating one or more miniature MT ferrules to corresponding one or more fiber optic connectors having their own such respective miniature MT ferrules.

SUMMARY OF THE INVENTION

According to one aspect, the present invention is directed to an adapter to mate bare fiber optic ferrules to respective fiber optic ferrules in a housing within fiber optic connectors, the adapter includes a main body having a plurality of ferrule-side openings on a ferrule side to receive the bare fiber optic ferrules and a plurality of connector-side openings on a connector side of the main body to receive the fiber optic connectors, a plurality of columns that extends between a top side and a bottom side of the main body, the ferrule-side openings defined by adjacent ones of the plurality of columns, a plurality of triggers attached to a top side of the adapter, each of the plurality of triggers having a pair of trigger legs, each trigger leg of the pair of trigger legs positioned inside respective columns on opposing sides, a holder extension groove oriented longitudinally in each column and configured to receive a holder extension of a fiber optic ferrule holder supporting a fiber optic ferrule, and a pair of ferrule stop pedestals on each column on opposite sides of each holder extension groove configured to seat the fiber optic ferrule when the fiber optic ferrule holder is fully inserted into the adapter.

In some embodiments, there is also a plurality of partitions, each of the plurality of partitions associated with a respective one of the plurality of columns.

In some embodiments, the plurality of partitions at least partial define the plurality of ferrule-side openings.

In some embodiments, a portion of each trigger leg extends from a respective column and into a portion of the holder extension groove.

In some embodiments, each of the trigger legs is movable within a respective column.

In some embodiments, the portion of each of the trigger legs of the pair of trigger legs extending into the holder extension groove has a chamfered portion to engage the fiber optic ferrule holder during insertion into the adapter.

In some embodiments, the portion of each of the trigger legs of the pair of trigger legs extending into the holder extension groove has a forward facing stop surface to engage a rearward facing surface of the fiber optic ferrule holder once the fiber optic ferrule holder has been inserted into the adapter.

In some embodiments, the ferrule-side openings are narrower at the columns than at an end of the adapter on the ferrule-side openings.

In some embodiments, each trigger leg of the pair of trigger legs is positioned inside respective columns on opposing sides of each of the plurality of ferrule-side openings.

In some embodiments, there are also a plurality of trigger receptacle openings on the top side of the adapter to receive the pair of legs of each of the plurality of triggers, the trigger receptacle openings being in communication with respective ones of the columns.

In some embodiments, each column includes an additional pair of ferrule stop pedestals, the additional pair of ferrule stops being in communication with a different ferrule side opening than a ferrule-side opening having the pair of ferrule stop pedestals.

In yet another aspect, there is an adapter to mate bare fiber optic ferrules to respective fiber optic ferrules in a housing within fiber optic connectors, the adapter includes a main body having a plurality of ferrule-side openings on a ferrule side to receive the bare fiber optic ferrules and a plurality of connector-side openings on a connector side of the main body to receive the fiber optic connectors, a plurality of partitions on the ferrule side, a plurality of columns associated with each of the partitions, each column in the plurality of columns extending between a top side and a bottom side of the main body, the ferrule-side openings defined by adjacent ones of the plurality of partitions and columns, a plurality of triggers attached to a top side of the adapter, each of the plurality of triggers having a pair of trigger legs, each trigger leg of the pair of trigger legs positioned inside respective columns on opposing sides of each ferrule-side opening, a holder extension groove oriented longitudinally in each column and configured to receive a holder extension of a fiber optic ferrule holder supporting a fiber optic ferrule, and a pair of ferrule stop pedestals on each column on opposite sides of each holder extension groove configured to seat the fiber optic ferrule when the fiber optic ferrule holder is fully inserted into the adapter.

In some embodiments, each partition of the plurality of partitions is joined to a respective column in the plurality of columns.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

BRIEF DESCRIPTION OF THE DRAWINGS

FIG. 21A is an enlarged view of a portion of the adapter and trigger in FIG. 21;

FIG. 22 is a perspective view of a cross-section of the bottom of the adapter;

DETAILED DESCRIPTION OF THE INVENTION

Figure 1:
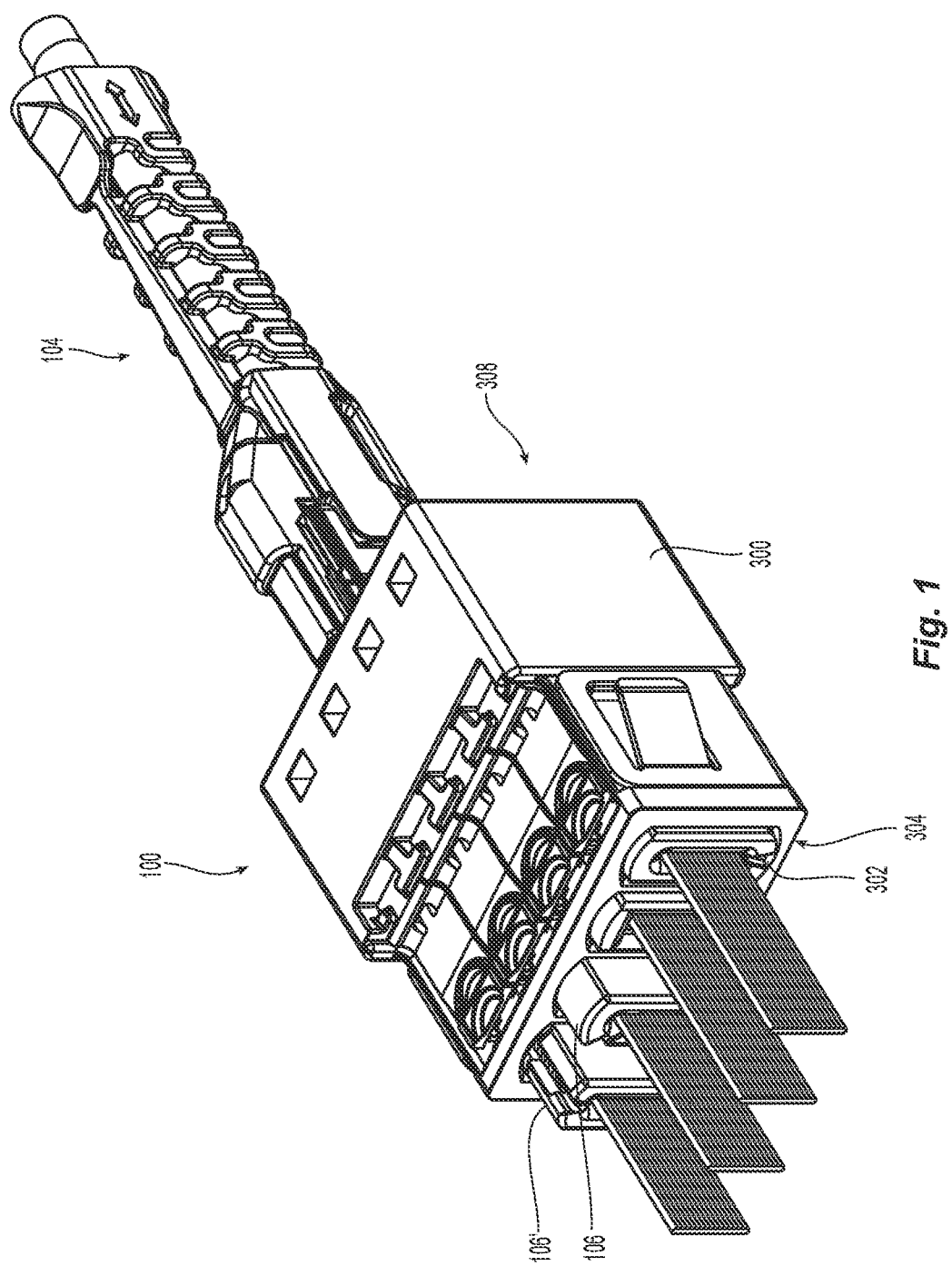
FIG. 1 is a perspective view of one embodiment of an adapter, fiber optic ferrule holders for bare fiber optic ferrules, and fiber optic connectors according to the present invention.

Reference will now be made in detail to the present preferred embodiment(s) of the invention, examples of which are illustrated in the accompanying drawings. Whenever possible, the same reference numerals will be used throughout the drawings to refer to the same or like parts.

Figure 2:
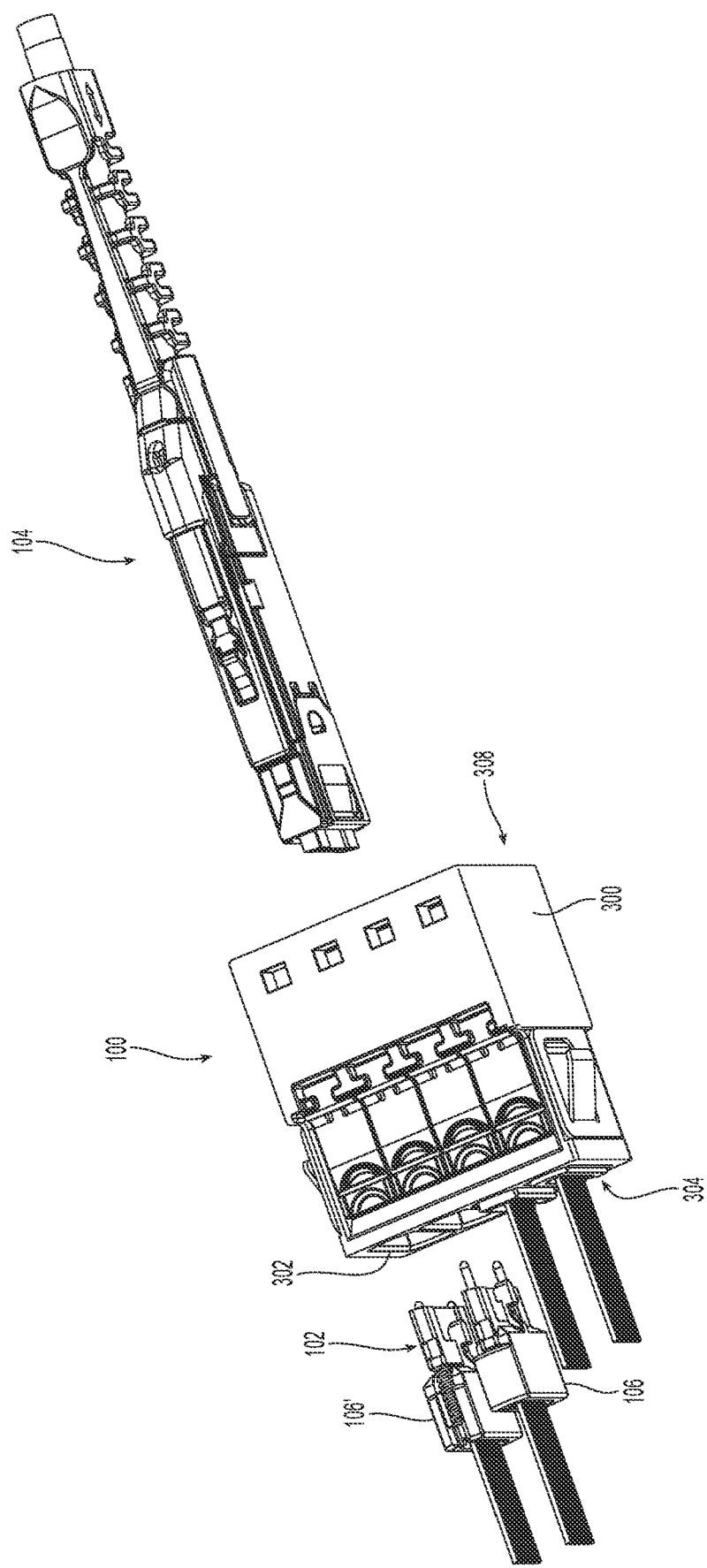
FIG. 2 is an exploded, perspective view of the adapter, bare fiber optic ferrules, fiber optic ferrule holders, and fiber optic connectors of FIG. 1.

Illustrated in FIGS. 1-2 is an adapter 100 that allows for mating bare multi-fiber fiber optic ferrules 102 to respective fiber optic connectors 104 (herein referred to interchangeably as "connectors"). The bare fiber optic ferrules 102 are the miniature MT ferrules discussed briefly above and in more detail below. The miniature MT ferrules 102 may be inserted into the adapter 100 with or without the assistance of a fiber optic ferrule holder 106. However, it is more likely that a combination 108 of the fiber optic ferrules 102 and the fiber optic ferrule holders 106 is used. The fiber optic ferrules 102 will be discussed in detail first and then the adapter 100 will be discussed in detail. FIGS. 1 and 2 also show an alternative embodiment of a fiber optic ferrule holder 106', a rear elevation view of which is shown in FIG. 9A.

Applicant notes that the term "front" or "forward" means that direction where the fiber optic ferrule would be inserted into the adapter 100. Therefore, in FIGS. 1-2, the front is to the left side of the adapter 100 as the right side is typically installed within a panel or other receptacle, and therefore being in the rear or behind the panel. In addition, each component described herein has a front side and a rear side, as understood by the context in which the component is being described. See, e.g., FIG. 3 showing these areas for the fiber optic ferrule 102.

Figure 3:
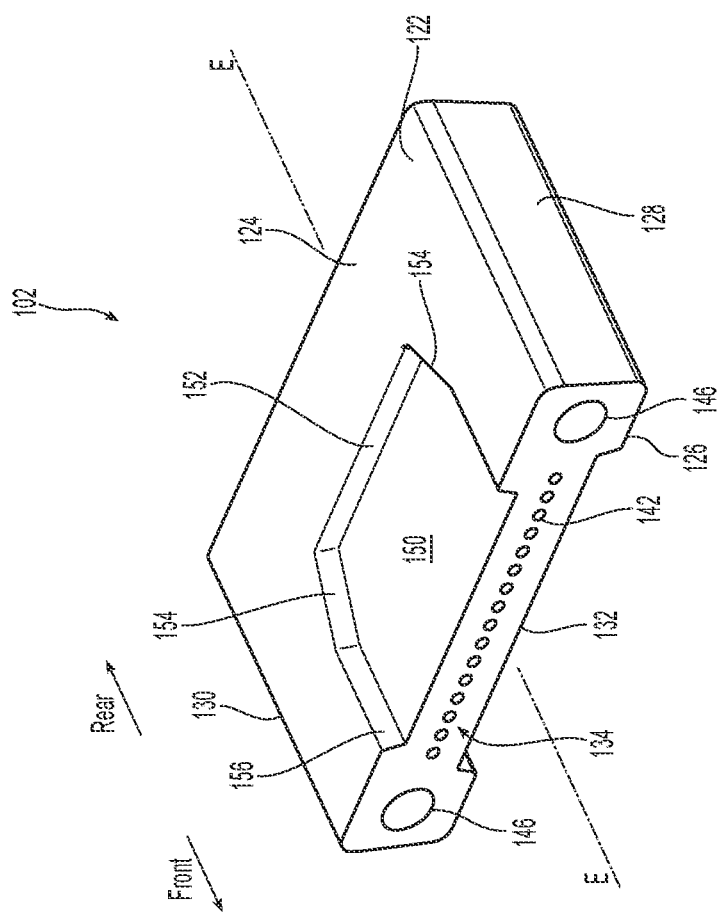
FIG. 3 is a top perspective view of one embodiment of a bare fiber optic ferrule without the optical fibers according to the present invention.
Figure 4:
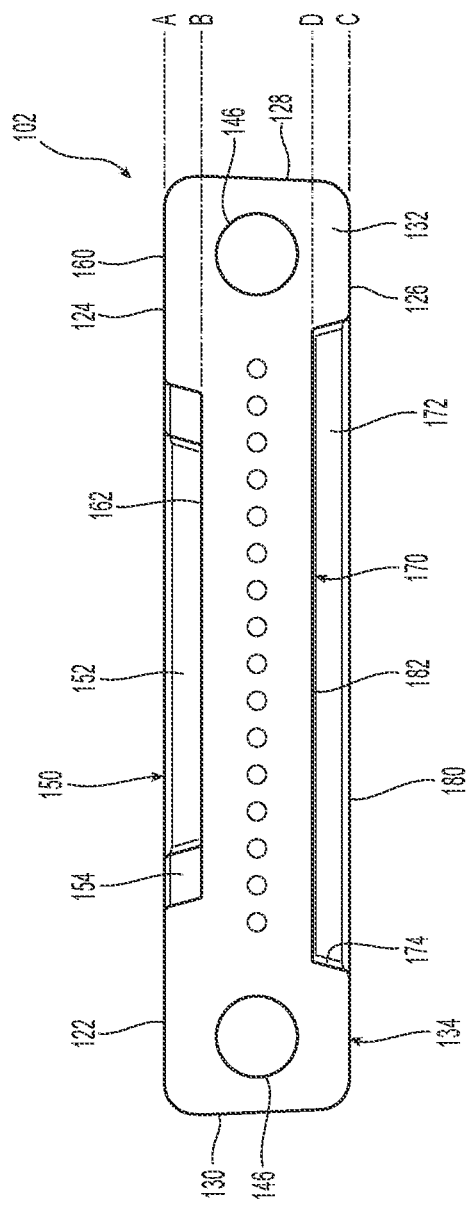
FIG. 4 is front elevational view of the fiber optic ferrule in FIG. 3.
Figure 5:
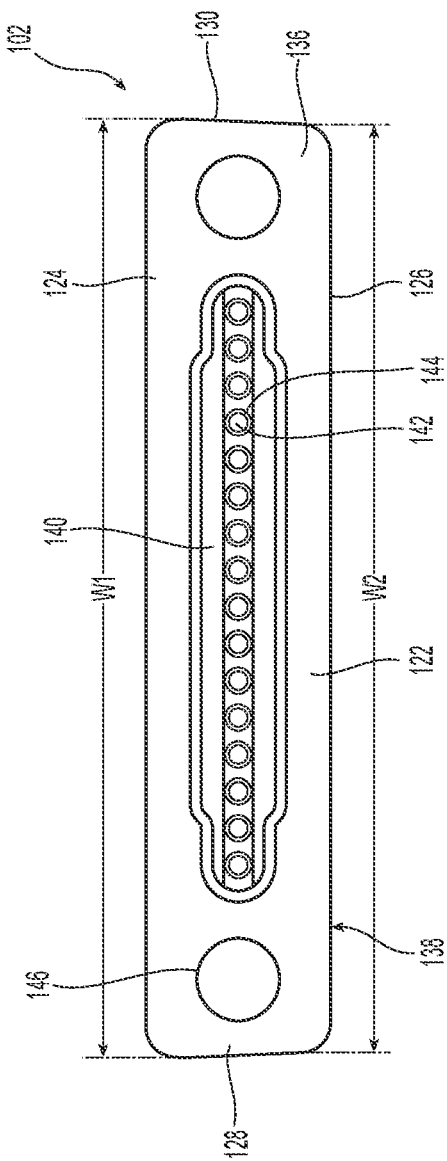
FIG. 5 is a rear elevational view of the fiber optic ferrule in FIG. 3.
Figure 6:
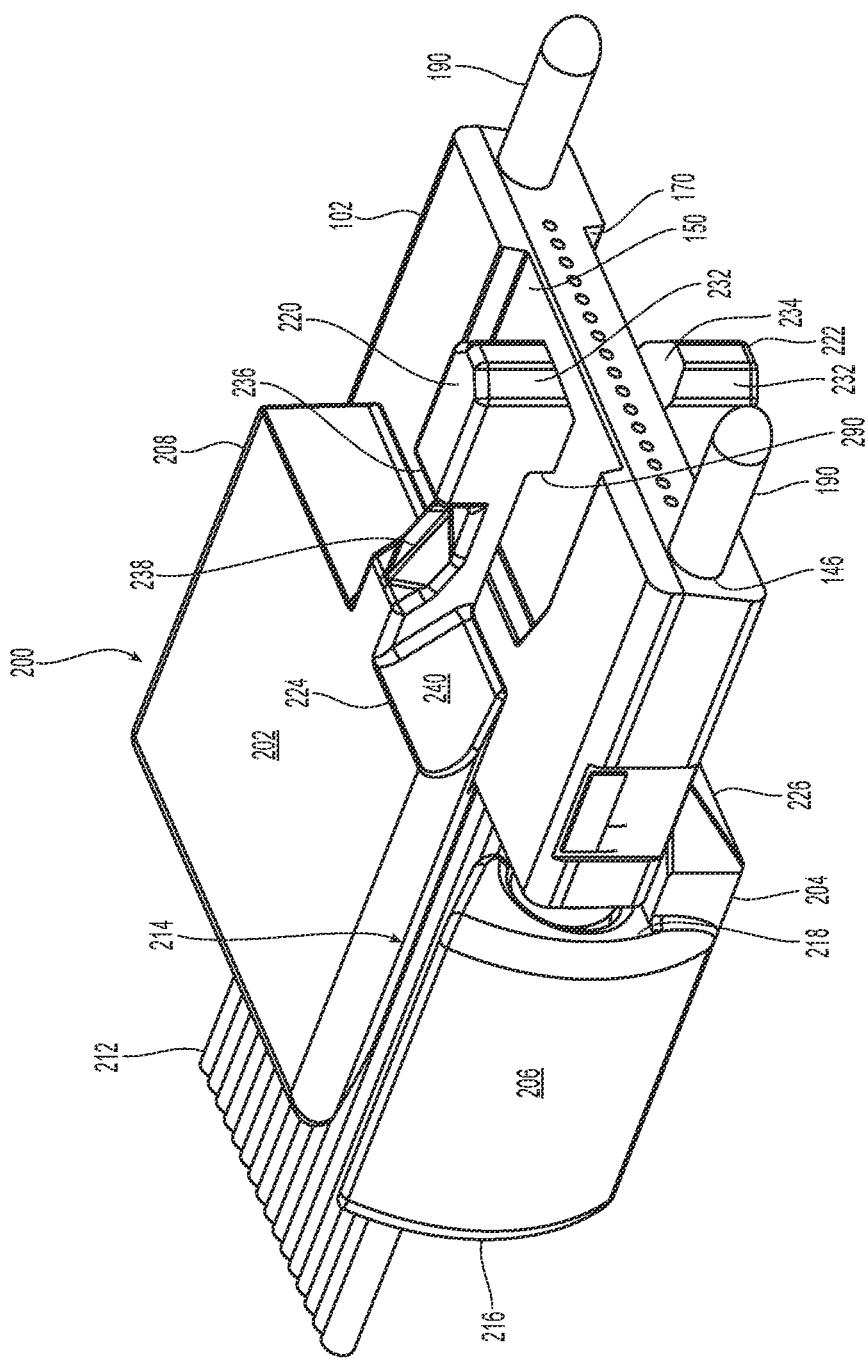
FIG. 6 is a front perspective view of one embodiment of a bare fiber optic ferrule and fiber optic ferrule holder according to the present invention.
Figure 7:
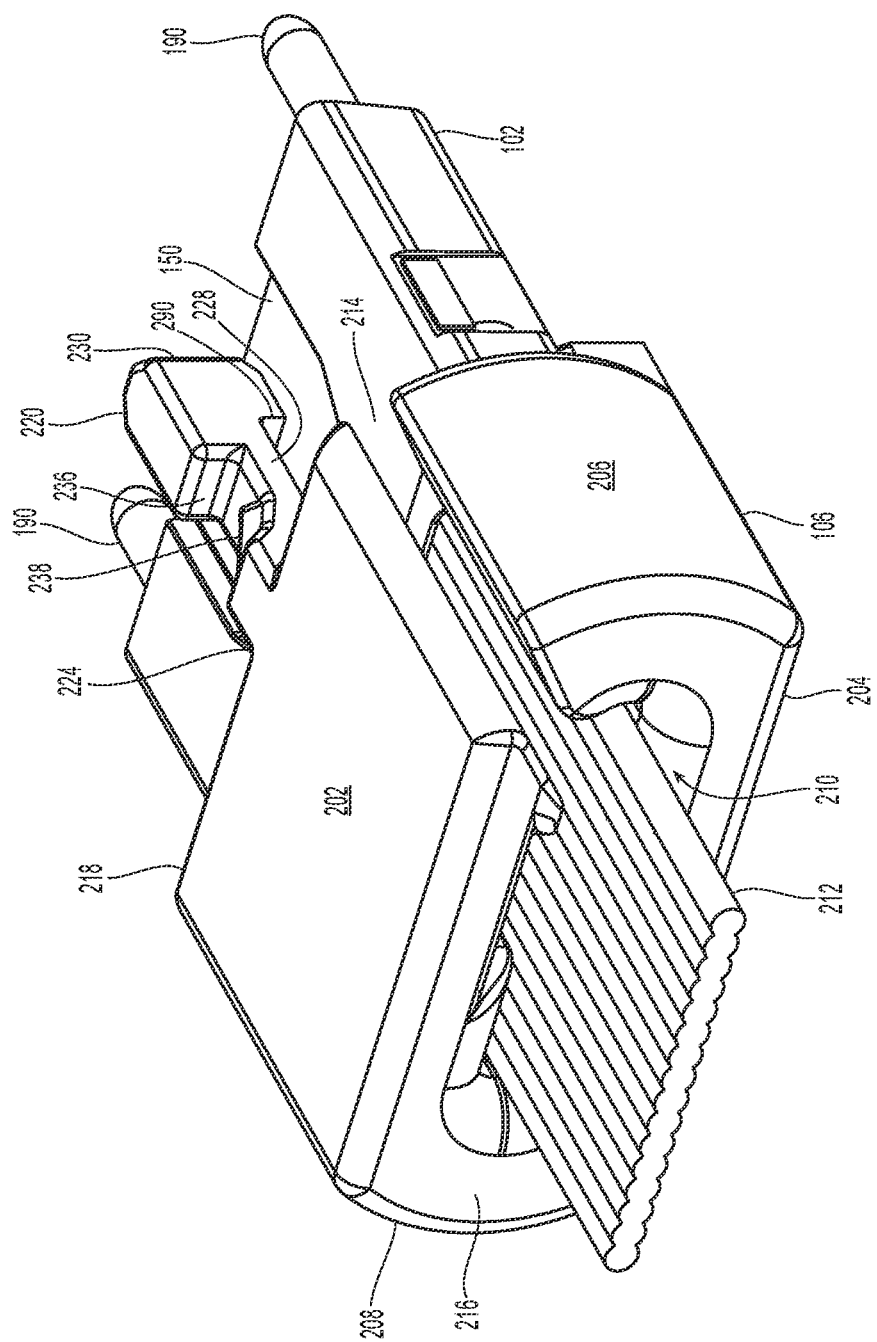
FIG. 7 is a rear perspective view of the bare fiber optic ferrule and fiber optic ferrule holder in FIG. 6.

Illustrated in FIGS. 3-5 is a fiber optic ferrule 102 according to the present invention. The fiber optic ferrule 102 has a main body 122 having a top portion 124 and a bottom portion 126. There is a first side portion 128 that extends between the top portion 124 and the bottom portion 126. There is also a second side portion 130 extending between the top portion 124 and the bottom portion 126 on opposites sides of the main body 122. The main body 122 also has an end face 132 at a front end 134 of the main body 122 and a rear face 136 at a rear end 138 of the main body 122. The fiber optic ferrule 102 is significantly smaller than the conventional MT-ferrule and has typical dimensions of 1.25 mm height, 4 mm length (between the front end 134 and the rear end 138), and a width of 6.4 mm between the first side portion 128 and the second side portion 130.

As seen in FIG. 5, the fiber optic ferrule 102 has a rear central opening 140 extending into the main body 122 from the rear face 136 and configured to receive at least three optical fibers (not shown). Typically, 8-16 optical fibers may be supported by the fiber optic ferrule 102. The fiber optic ferrule 102 also has a plurality of fiber support structures 142 to support the optical fibers. The fiber support structures 142 are in communication with the rear central opening 140 and extending through the main body 122 to the end face 132. Along the length of the fiber support structures 142 there may be chamfered portions 144 that assist in an insertion of the optical fibers into the fiber optic ferrule 102 without the skiving of the front ends of the optical fibers. The fiber support structures 142 may be fiber openings or fiber bores, but may alternatively be groove structures, or the combination or both. The main body 122 may also include two guide pin holes 146, which extend between the end face 132 and the rear face 136. The guide pin holes 146 provide a reference point with respect to the main body 122 and other structures to which the fiber optic ferrule 102 is mated. As noted below, the guide pin holes 146 are outside the area of cutouts 150,170 such that enough material in the main body 122 is present to allow for the guide pin holes 146. The fiber optic ferrule 102 may also have guide pins 190. The end face 132 may have a rectangular profile, although a trapezoidal profile (as shown) may also be provided as an alternative.

The top portion 124 has a top cut-out 150 that forms a first forward facing surface 152. The first forward facing surface 152 is used as a ferrule stop surface in conjunction with a housing for a connector, e.g., an SFP/QSFP format fiber optic connector. However, as described in this disclosure, the bare fiber optic ferrule is not provided with a typical housing of a connector, and is present by itself or "bare." Instead, the fiber optic ferrule holder 106 provides support in handling of the bare fiber optic ferrule 102 when the latter is being advanced into the adapter 100. Still, the first forward facing surface 152 plays a role in seating the bare fiber optic ferrule 102 inside the adapter 100, as will be described in detail herein. There may also be a number of other surfaces formed by the top cut-out 150. For example there is a second, slanted surface 154 on both sides of the top cut-out 150 that assist in the location of the fiber optic ferrule 102 in the housing for a connector. The second, slanted surfaces 154 assist in moving the fiber optic ferrule 102 in a side-to-side manner relative to the housing. There are also laterally facing surfaces 156 on each side that form the last part of the cut-out 150 and extend to the end face 132 from the second, slanted surfaces 154. As illustrated in the figures, the top cut-out 150 does not extend all of the way to the rear end 138, but stops short at the first forward facing surface 152. However, a portion of the top cut-out 150 could extend all the way to the back of the fiber optic ferrule 102. For example, a cutout in the shape of a "T" with a thin narrow section going all the way to the back would work as well, as long as there is at least one forward facing surface adjacent to such a variation of the top cut-out 150. This applies to a bottom cut-out 170 as well, described below.

The top portion 124 has a first surface 160 that lies in a first plane A and the cut-out 150 forms a second surface 162 that lies in a second plane B. See FIG. 4. Planes A and B are preferably parallel to one another but off set, with plane B being closer to a longitudinal axis E passing through the center of the main body 122 and through the rear central opening 140 between the front end 134 and the rear end 138. See also FIG. 5. It should also be noted that the cut-out 150 does not extend into the rear central opening 140 or the fiber support structures 142.

Similarly, the bottom portion 124 has the bottom cut-out 170 that forms a second forward facing surface 172. The second forward facing surface 172 is also used as a stop surface in conjunction with a housing for a connector. Again, in this respect, the bare fiber optic ferrule 102 is not provided with a typical housing for the fiber optic connector 104. The bottom cut-out 170 also has two laterally facing surfaces 174 that form a portion thereof. The bottom cut-out 170 extends from the end face 132 towards the rear end 138, but does not reach the rear end 138. It may reach the same distance toward the rear end 138 from the end face 132 as does the top cut-out 150, but it may stop short of or beyond where the top cut-out 150 stops at forward facing surface 152.

The bottom portion 124 has a first surface 180 that lies in a third plane C and the bottom cut-out 170 forms a fourth surface 182 that lies in a fourth plane D. See FIGS. 4 and 5. The planes C and D are preferably parallel to one another but off set, with plane D being closer to the longitudinal axis E passing through the center of the main body 122 and through the rear central opening 140 between the front end 134 and the rear end 138. It should also be noted that the bottom cut-out 170 does not extend into the rear central opening 140 or the fiber support structures 142.

Returning to the main body 122, there is the first side portion 128 that extends between the top portion 124 and the bottom portion 126. There is also the second side portion 130 extending between the top portion 124 and the bottom portion 126 on opposites sides of the main body 122. The first side portion 128 and the second side portion 130 are smooth between the front end 134 and the rear end 138. Additionally, there is no shoulder with fiber optic ferrule 102 making the profile from the back to the front the same as the front to the back—and also the same at the end face 132 and the rear face 136. This is in contrast with the traditional MT ferrule, which is significantly larger, and has a shoulder to seat the ferrule inside a housing of a connector. That is, the fiber optic ferrule 102 is shoulder-less. The term shoulder-less referring to a lack of any protrusions or other features on the first side portion 128 and the second side portion 130 that may be used to engage the fiber optic ferrule 102 with a receptacle or an adapter. There are also no sharp edges along the length of the multi-fiber fiber optic ferrule 102 at the junction of the side portions 128,130 to the top and bottom portions 124,126. See, e.g., FIGS. 3 and 4. It should also be noted that the top portion 124 may be wider than the bottom portion. That is, the distance across the top portion 124 may be greater than the distance across the bottom portion 126 between the side portions. That is, W1 may be greater that W2 as illustrated in FIG. 5. Alternatively, W1 equals W2.

The end face 132 may be angle-polished (i.e., at an angle relative to the rear face 136). Alternatively, the end-face 132 may be flat polished. The top cut-out 150 may have a different width than the bottom cut-out 170. This may act as a polarity indication and/or may cause the fiber optic ferrule 102 to be oriented in a specific direction when received inside a receptacle or an adapter for mating with another ferrule. Alternatively, the top cut-out 150 may have a same width as the bottom cut-out 170.

Turning now to FIGS. 6-13, there is a fiber optic ferrule holder 106 that is used with the fiber optic ferrule 102 and the adapter 100. Generally, the fiber optic ferrule holder 106 makes it easier to handle the bare fiber optic ferrule 102, especially during insertion and removal into or from the adapter 100. As discussed in more detail below, the fiber optic ferrule holder 106 may take various forms, e.g., the fiber optic ferrule holder 106' in FIGS. 1, 2, and 9A. The fiber optic ferrule holder 106 has a body 200 with a first side 202, a second side 204 opposite the first side 202, a top side 206, and a bottom side 208 opposite the top side 206. The top side 206 and the bottom side 208 are preferably curved, with the curvature extending the farthest away from the body 200 approximately half way between the first side 202 and the second side 204. See FIGS. 8 and 9. The body 200 also has a central opening 210 defined at least in part by the first side 202, the second side 204, the top side 206, and the bottom side 208. The central opening 210 receives the optical fibers 212 that are secured within the fiber optic ferrule 102. See FIGS. 7 and 11. The optical fibers 212 may be in a ribbon format or loose optical fibers.

The fiber optic ferrule holder 106 has a slot 214 extending longitudinally from a back end 216 of the fiber optic ferrule holder 106 to a front end 218 of the central opening 210. See FIGS. 7-9. As seen, the location of the slot 214 is about where the first side 202 meets with the top side 206. However, the slot 214 could be located in other places around and on the body 200 and still fall within the scope of the present invention. See also FIG. 9A. Preferably, the slot 214 is dimensioned so that it is larger than the diameter of an optical fiber 212.

Extending longitudinally from the first side 202 and the second side 204 are holder extensions 220,222. The first holder extension 220 extends from the front 224 of the first side 202 and the second holder extension 222 extends from the front 226 of the second side 204. Each of the first holder extension 220 and the second holder extension 222 are mirror images of each other and therefore only the first holder extension 220 will be discussed. The discussion will also apply to the second holder extension 222.

The first holder extension 220 has a main arm 228 with a head portion 230, the head portion 230 having opposing chamfered side surfaces 232 that generally face forward. These chamfered side surfaces 232 assist in aligning the fiber optic ferrule holder 106 and the fiber optic ferrule 102 with the adapter 100. See FIGS. 8, 25, 32, 35, and 39 and discussion below. The holder extensions 220,222 also each have a chamfered surface 234 that face each other and assist in spreading the holder extensions 220,222 away from each other when the fiber optic ferrule holder 106 is installed on the fiber optic ferrule 102. See FIGS. 6 and 10 in particular. Moving from the head portion 230 backwards toward the first side 202, there is a ramp stop surface 236 on the back of the head portion 230 that faces toward the first side 202 and engages the adapter 100. Also between the ramp stop surface 236 and the first side 202 is a groove 238 that receives a portion of the adapter 100. This combination is described in detail below.

There is another chamfered surface that further assists the fiber optic ferrule holder 106 with the fiber optic ferrule 102 to be installed in the adapter 100. That is, the first side 202 and the second side 204 have a chamfered surface 240,242, respectively, that extend from the front thereof. The chamfered surface 240 extends from the front 224 of the first side 202, while the chamfered surface 242 extends from the front 226 of the second side 204. The chamfered surfaces 240,242 assist in aligning the fiber optic ferrule holder 106 and the fiber optic ferrule 102 with the plurality of ferrule-side openings 302 in the adapter 100. See, e.g., FIG. 17 and the discussion below.

Figure 8:
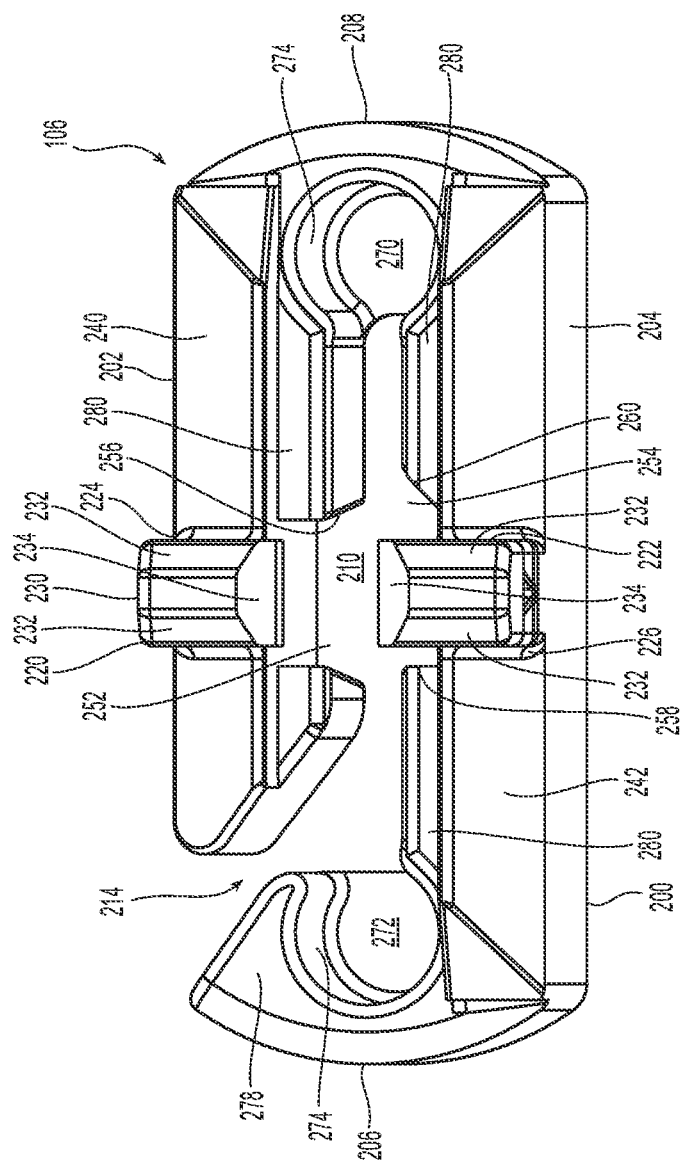
FIG. 8 is front elevational view of the fiber optic ferrule holder in FIG. 6.
Figure 9:
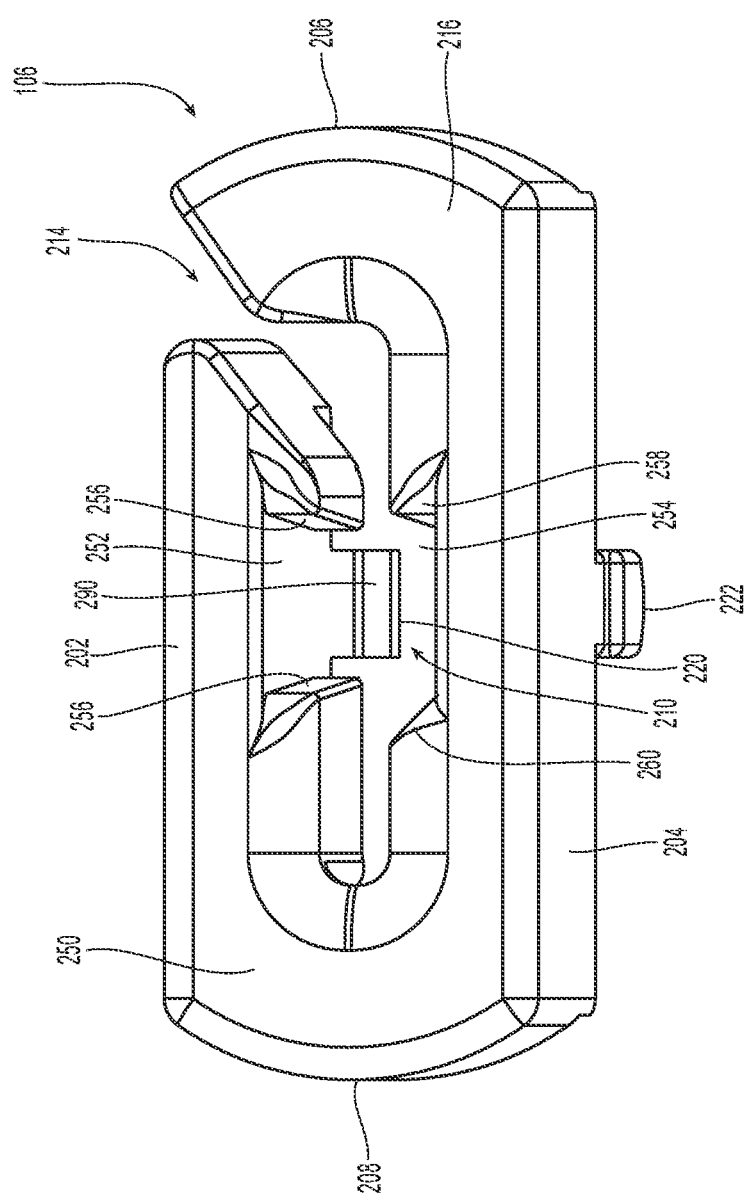
FIG. 9 is a rear elevational view of the fiber optic ferrule holder in FIG. 6.
Figure 9A:
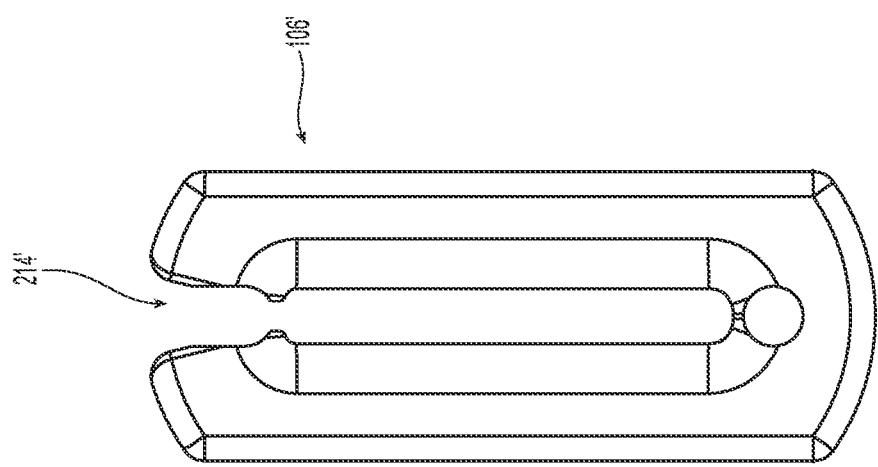
FIG. 9A is a rear elevational view of another embodiment of a fiber optic ferrule holder according to the present invention.
Figure 10:
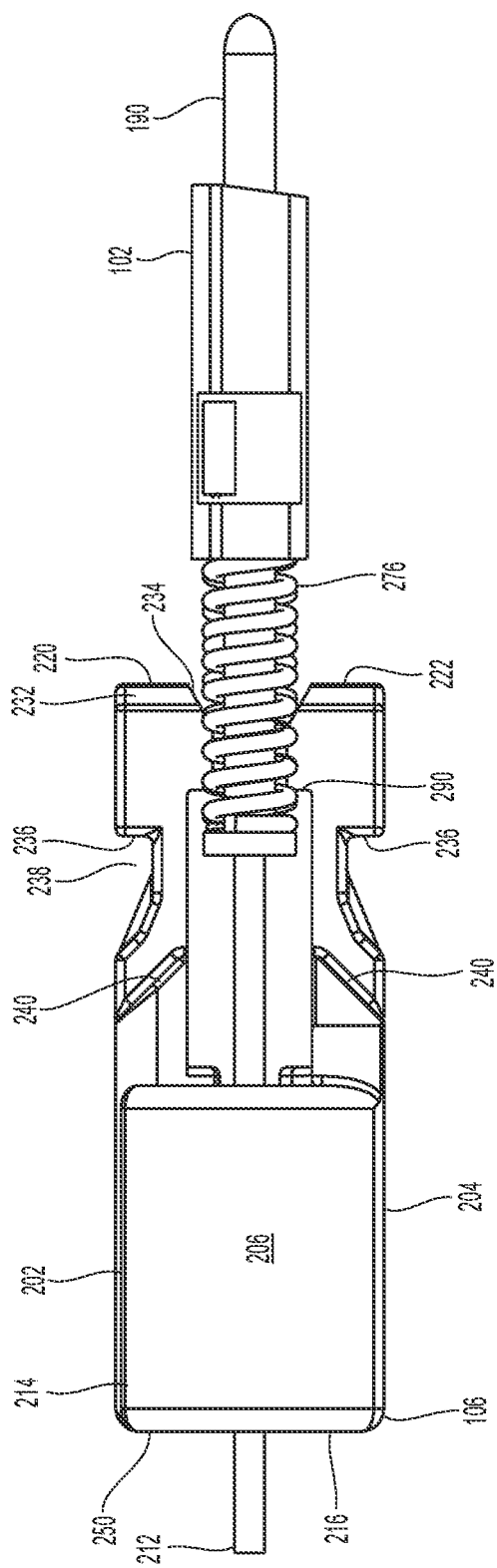
FIG. 10 is top elevational view of the fiber optic ferrule holder in FIG. 6 in an uncompressed state.
Figure 11:
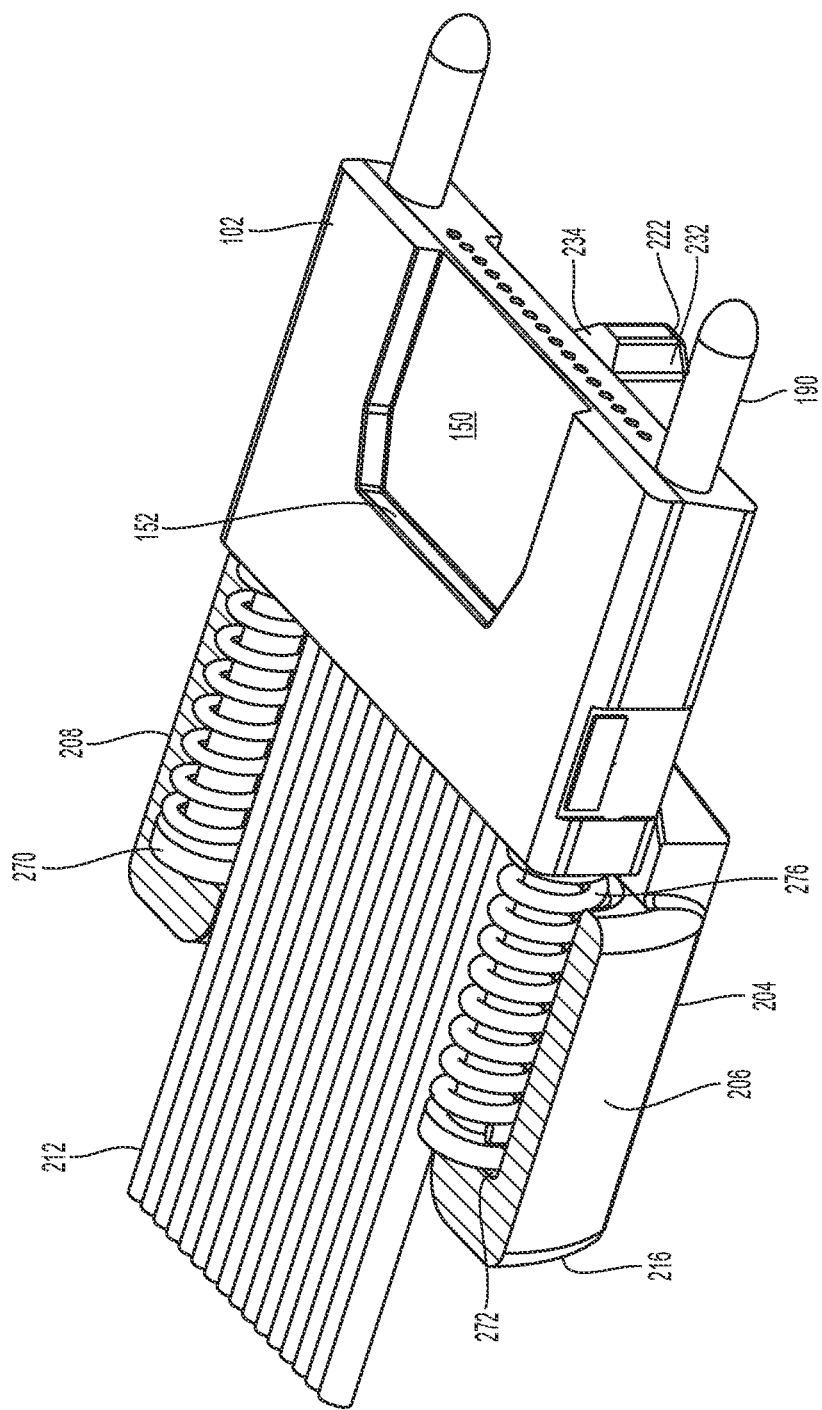
FIG. 11 is a partial cross section perspective view of the fiber optic ferrule and fiber optic ferrule holder of FIG. 6.
Figure 12:
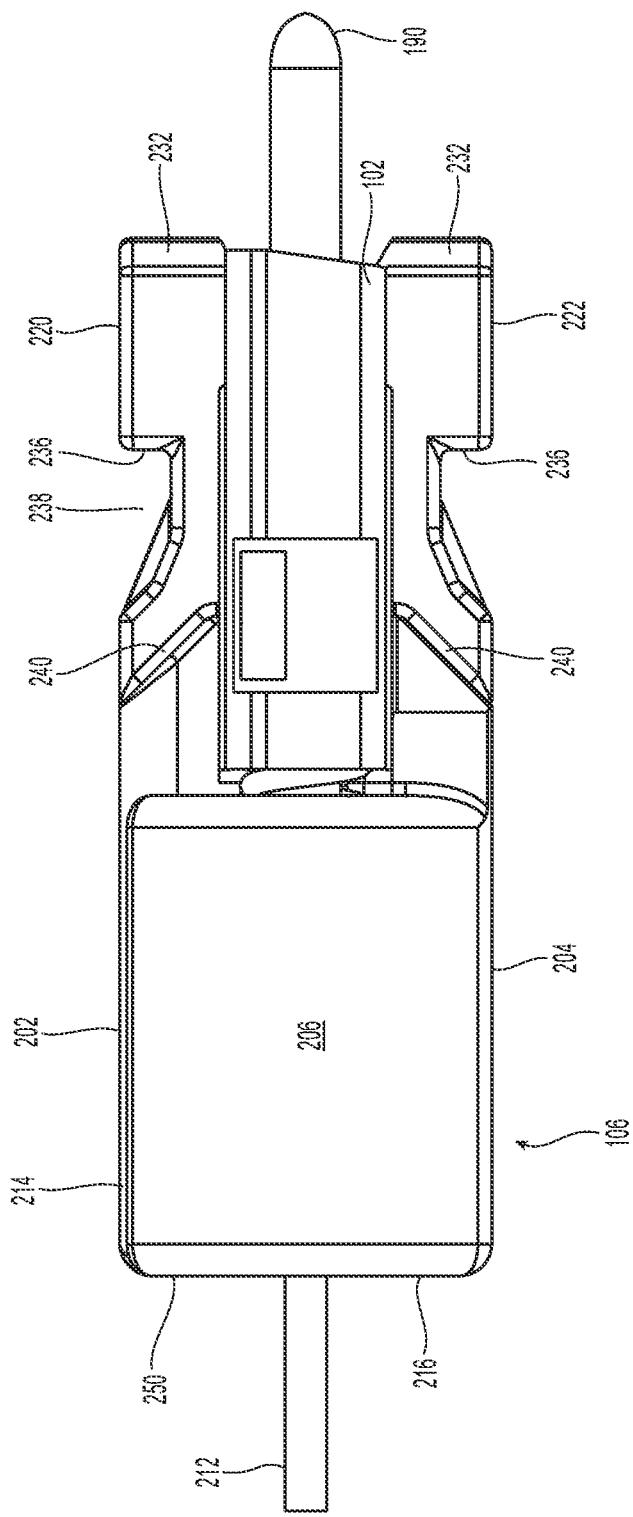
FIG. 12 is a top elevational view of the fiber optic ferrule holder and fiber optic ferrule of FIG. 6 in a compressed state.
Figure 13:
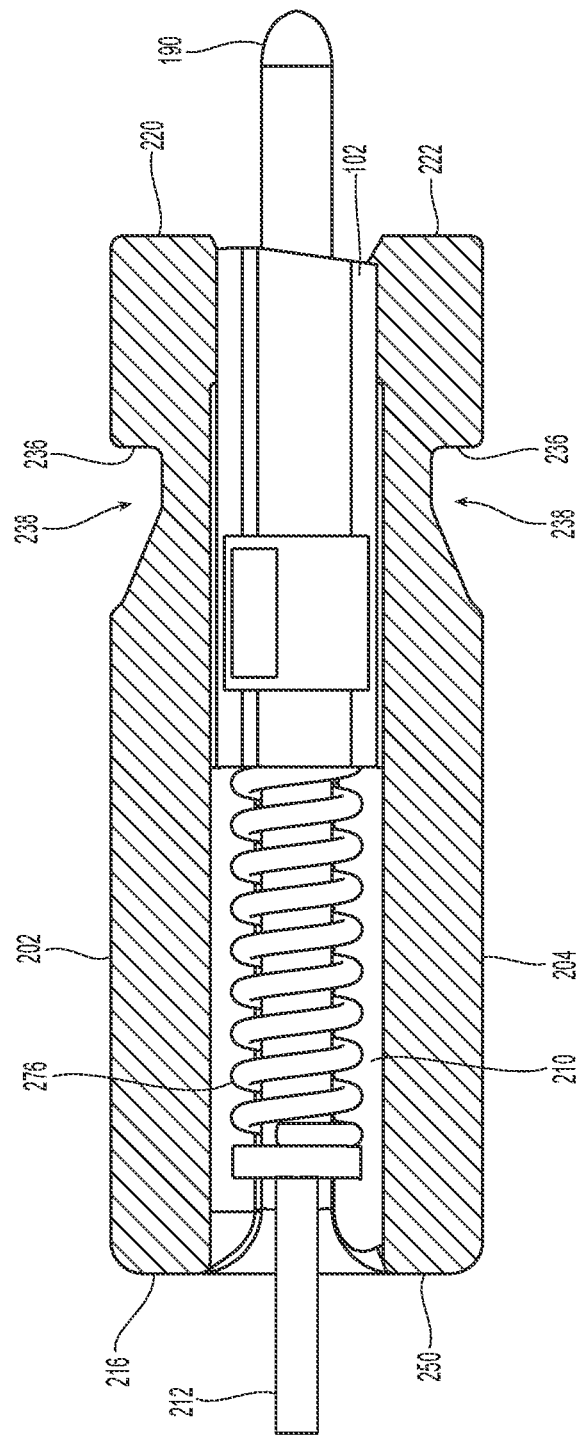
FIG. 13 is a top elevational view of the fiber optic ferrule and a partial cross section of the fiber optic ferrule holder of FIG. 12.

Turning to FIGS. 8 and 9, the fiber optic ferrule holder 106 has features that assist in the insertion and removal of the fiber optic ferrule 102 in the adapter 100. The back end 216 of the fiber optic ferrule holder 106 has a rear facing surface 250 that also functions as a rear push surface and allows the installer to push on the rear facing surface 250 to install the fiber optic ferrule 102. Best seen in FIG. 9 are two internal grooves 252,254. The first internal groove 252 is in the first side 202 (top side in FIG. 9) and has two walls 256 that are perpendicular to the central opening 210. The second internal groove 254 is on the second side 204 and has one straight wall 258 that is adjacent to the slot 214. The second internal groove 254 has a second slanted/angled wall 260, i.e., not perpendicular to the central opening 210. This slanted wall 260 assists in inserting the optical fibers 212 into the central opening 210, especially when the optical fibers 212 are in a ribbon form. If the optical fibers 212 being inserted make contact with the slanted wall 260, the optical fibers 212 will ride up the slanted wall 260 and into the central opening 210 toward the bottom side 208, and not get stub or get stuck in the second internal groove 254. The two internal grooves 252,254 assist in managing the optical fibers 212 within the fiber optic ferrule holder 106.

The fiber optic ferrule holder 106 has two guide pins stops 270,272 that are within the central opening 210. The guide pins stops 270,272 are on either side of the central opening 210 and at the end of partial cylinders 274, which assist in containing springs 276 that surround the guide pins 190. The springs 276 are positioned rearward of the fiber optic ferrule 102. Although the figures show compression coil springs, it would also be possible to use a metal leaf spring or plastic beam to apply a force to the ferrule. See, e.g., FIG. 10. Ends of the guide pins 190 may engage the guide pin stops 270,272. The fiber optic ferrule holder 106 also has forward facing surfaces 278. However, in front of the forward facing surfaces 278 are float stops 280 that engage the fiber optic ferrule 102 during the insertion of the fiber optic ferrule 102 in the adapter 100.

Finally, with respect to the fiber optic ferrule holder 106 there is a rear facing stop surface 290 on each of the holder extensions 220,222. See, e.g., FIG. 9. Each of the rear facing stop surfaces 290 are configured to engage the forward facing surfaces (ferrule stop surfaces) 152,172 of the top cut-out 150 and the bottom cut-out 170 of the fiber optic ferrule 102, respectively. Thus, when one pulls on the fiber optic ferrule holder 106 (generally in a direction parallel to the longitudinal axis E), the holder extensions 220,222 move relative to the fiber optic ferrule 102 and the rear facing stop surfaces 290 engage the forward facing surfaces 152,172, pulling the fiber optic ferrule 102 out of the adapter with the fiber optic ferrule holder 106. In this state when the combination of the fiber optic ferrule 102 and the fiber optic ferrule holder 106 is disengaged from the adapter 100, or is free, the guide pins 190 are only slightly protruding past the end face 132, see FIG. 14. This moveable positioning of the guide pins 190 with only a slight protrusion when the bare fiber optic ferrule 102 is not fully seated inside the adapter 100 helps with avoiding pin stubbing, especially when the fiber optic connector 104 with its own fiber optic ferrule is already present inside the adapter 100. The combination of the bare fiber optic ferrule 102 and the fiber optic ferrule holder 106 stays together due to the engagement of the holder extensions 220,222 with the respective cutouts 150, 170. The holder extensions 220,222 are generally made of plastic material and are biased to be in contact with the fiber optic ferrule 102, e.g., at the top cut-out 150 and the bottom cut-out 170, respectively. The fiber optic ferrule 102 does not slide back into the central opening 210 due to the presence of the guide pins 190 and the springs 276. Although the figures show the guide pins 190 present in the fiber optic ferrule holder 106, the fiber optic ferrule holder 106 could also operate without the guide pins in which case the mating ferrule would be male with guide pins.

Turning briefly to FIG. 9A again, there is an alternative embodiment of a fiber optic ferrule holder 106' that has a slot 214' along the top (or bottom) side 206'. There are still the other features that are present in the first embodiment of fiber optic ferrule holder 106.

Figure 16:
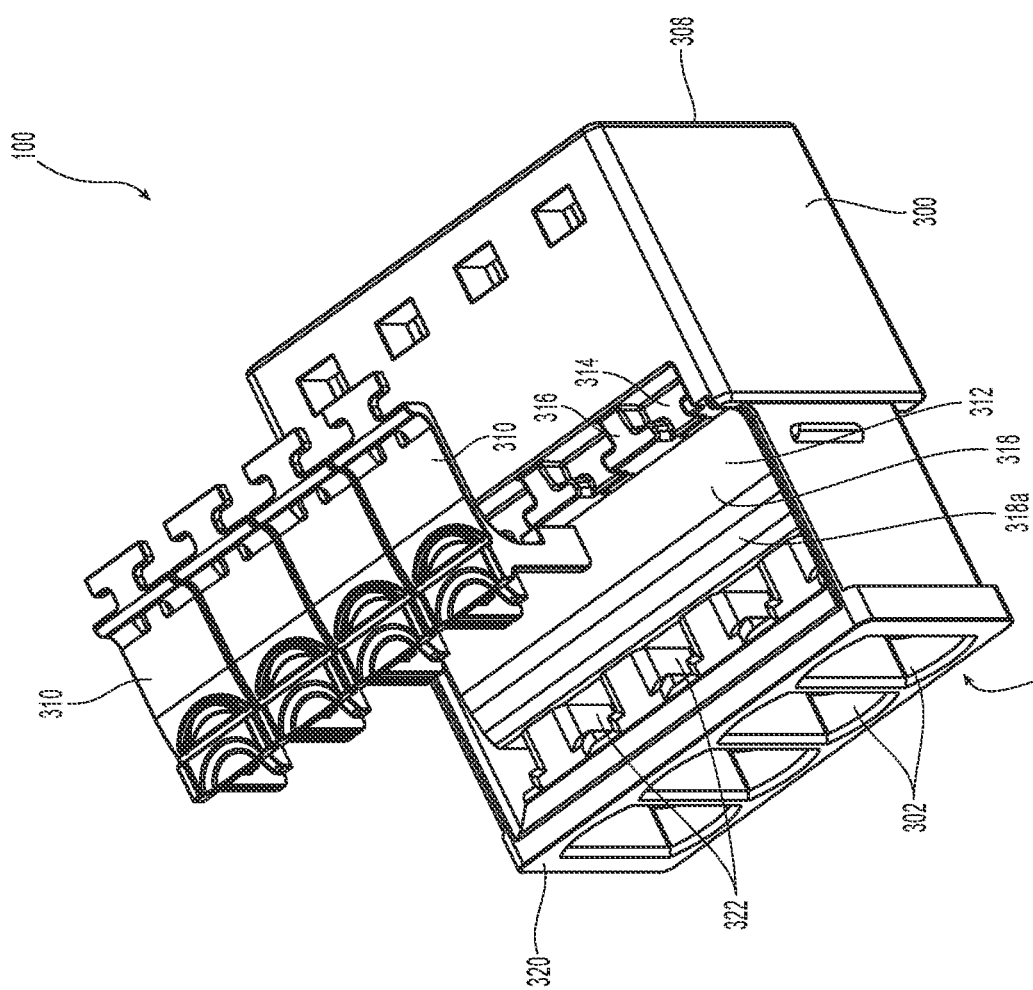
FIG. 16 is perspective view of the adapter in FIG. 1 with the triggers separated therefrom.
Figure 20:
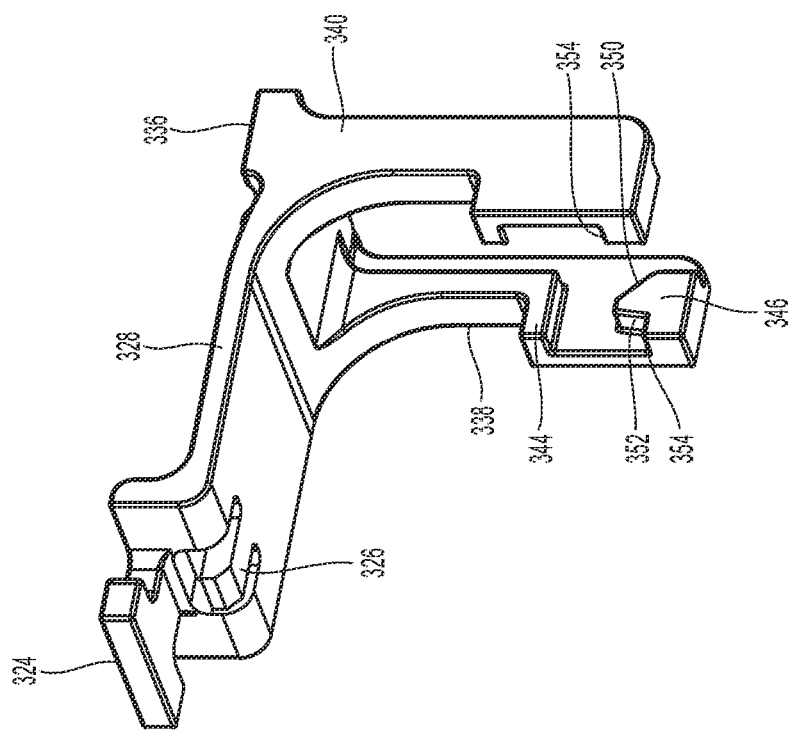
FIG. 20 is a perspective view from underneath the trigger in FIG. 19.
Figure 19:
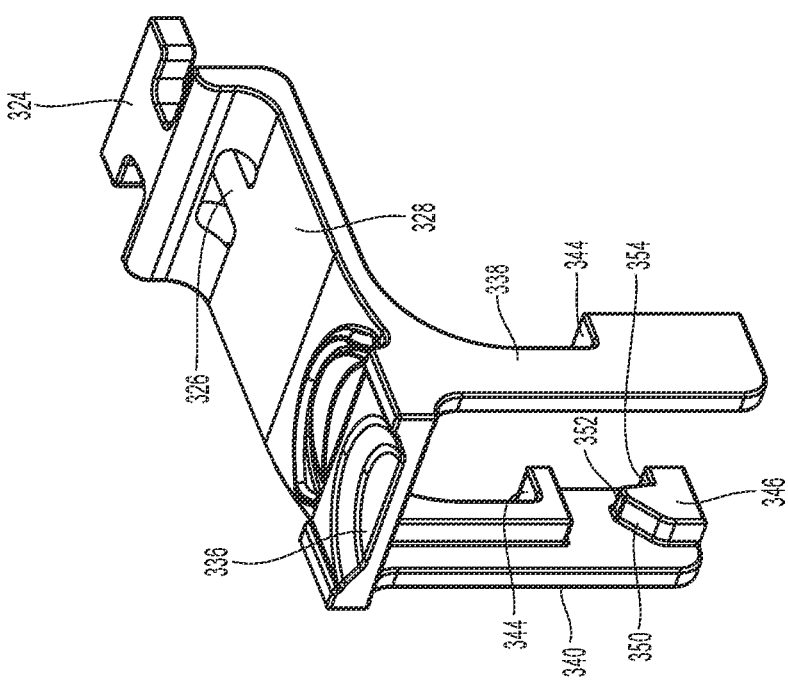
FIG. 19 is a perspective view of a trigger used with the adapter in FIG. 1.
Figure 21:
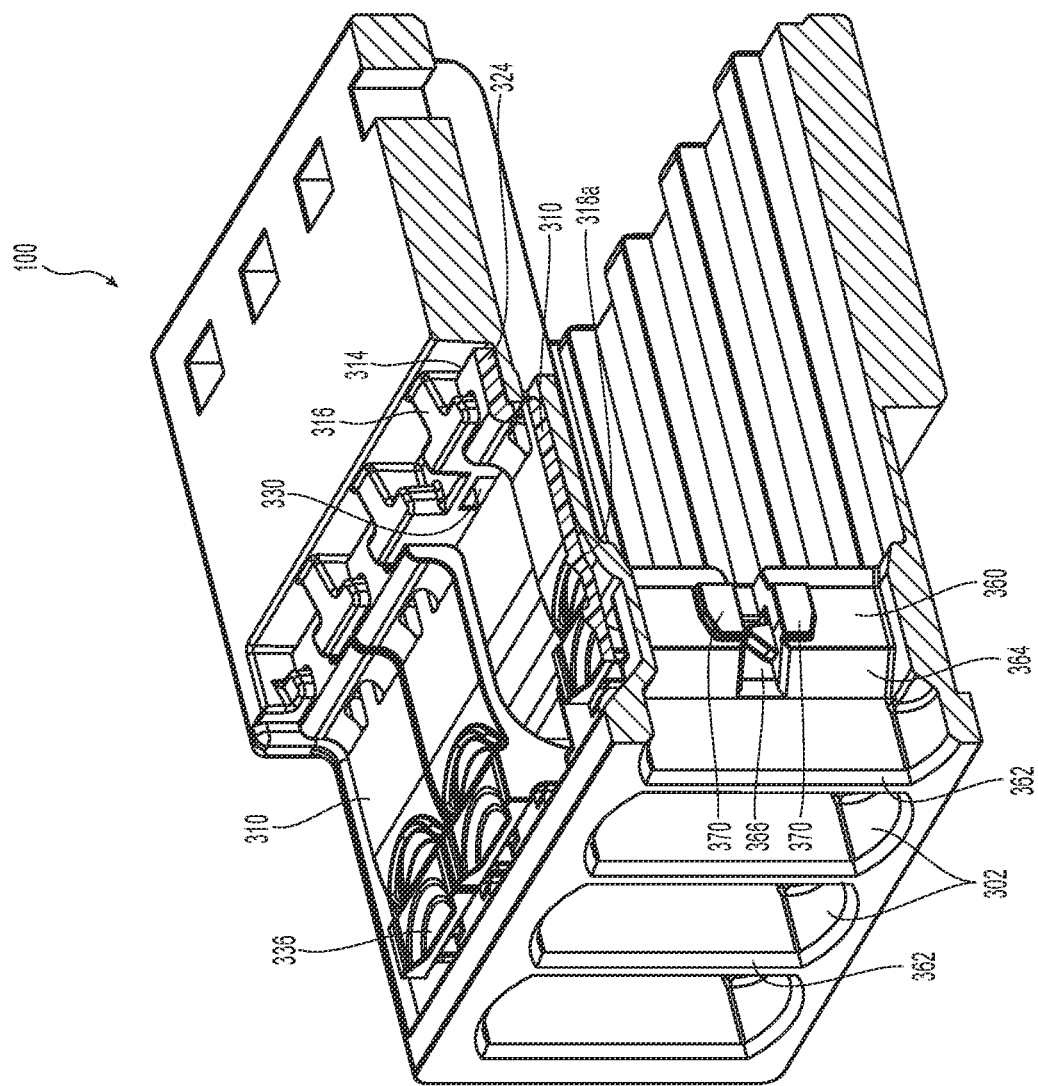
FIG. 21 is a cross section of a partial view of the adapter and trigger.
Figure 23:
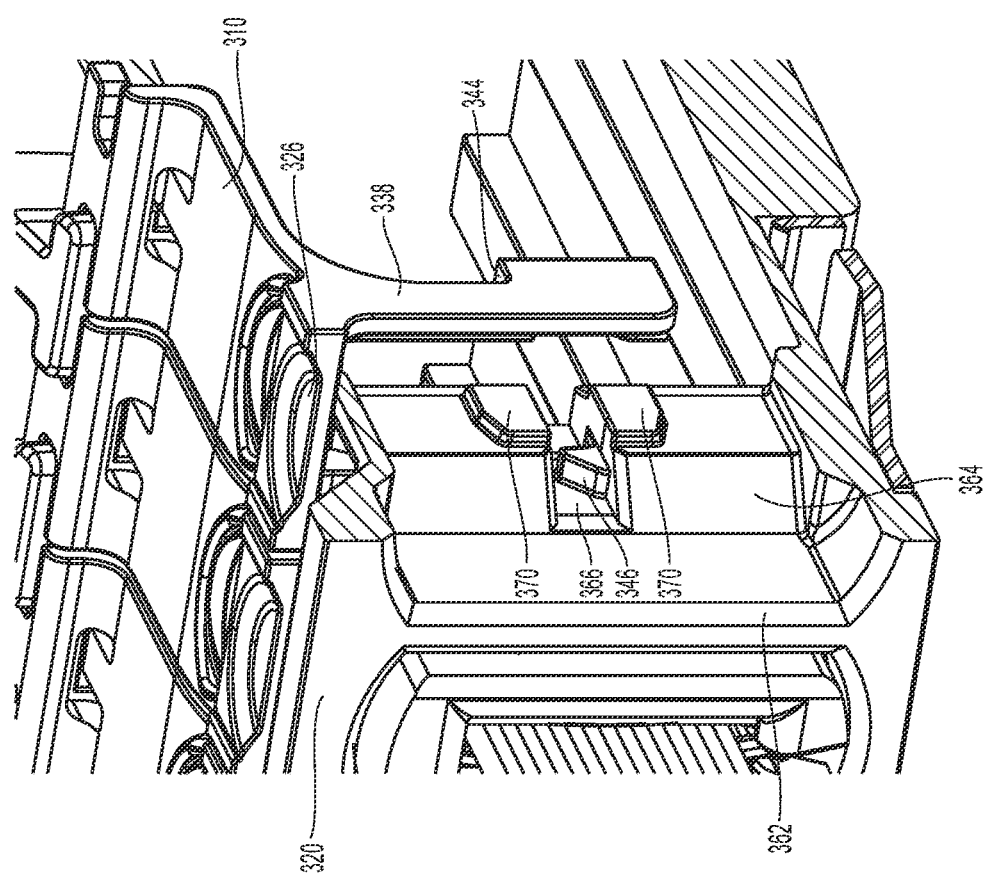
FIG. 23 is a perspective view of a partial cross-section of the adapter showing the positioning of the trigger legs.

Turning to the adapter 100 illustrated in FIGS. 16-23, the adapter 100 has a main body 300 with at least one ferrule-side opening 302 on a ferrule side 304 to receive a plurality of fiber optic ferrules 102. See FIG. 17. The adapter 100 as shown is a unitary molded or is a single-piece adapter. However, a two-piece adapter may be molded and the two pieces may be joined together to assemble the adapter 100. While there are a number of ferrule-side openings 302 illustrated in the figures, there may be more or fewer. The main body 300 also has a plurality of connector side openings 306 on a connector side 308 to receive fiber optic connectors 104. See FIG. 18; see also FIGS. 1 and 2. Again, there could be more or fewer connector side openings 306—should be the same number on both sides of the adapter 100. Triggers 310 are attached to the adapter 100 on the ferrule side 304. FIGS. 16, 19, and 20. The triggers 310, as discussed below, are used to keep the bare fiber optic ferrules 102 in the adapter 100 until they need to be removed. As illustrated in FIG. 16, the plurality of triggers 310 are attached to the adapter 100 on a top side 312 (naming convention only). The adapter 100 has a plurality of tab receptacles 314 with trigger partitions 316 separating each of the plurality of tab receptacles 314. The adapter 100 also has a trigger support area 318 between the tab receptacles 314 and a front face 320 of the ferrule side 304. The trigger support area 318 has a curved surface 318a. See FIGS. 21 and 21A. As discussed below, the adapter 100 has trigger receptacle openings 322 that are disposed between the trigger support area 318 and the front face 320.

Figure 24:
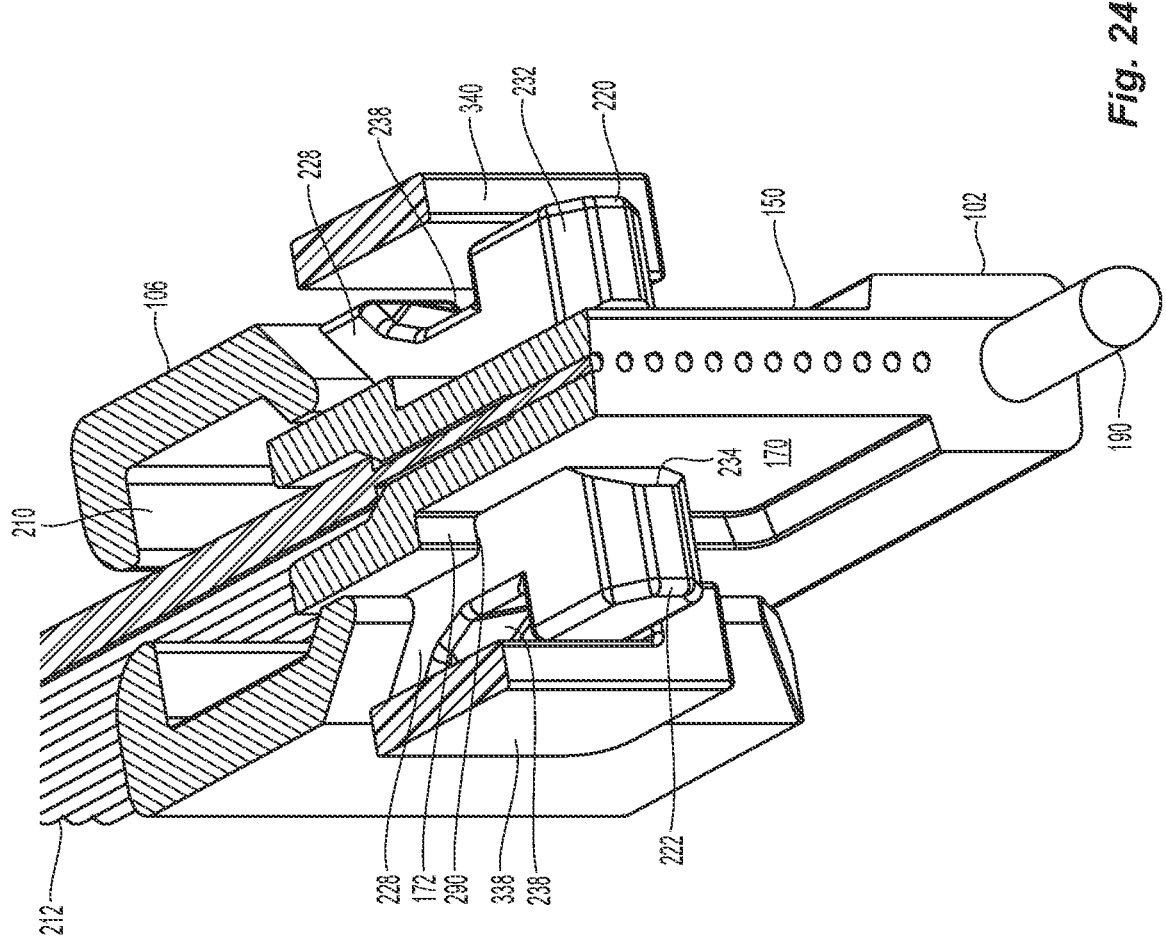
FIG. 24 is a perspective view of the fiber optic ferrule and the fiber optic ferrule holder engaging the trigger of the adapter.
Figure 25:
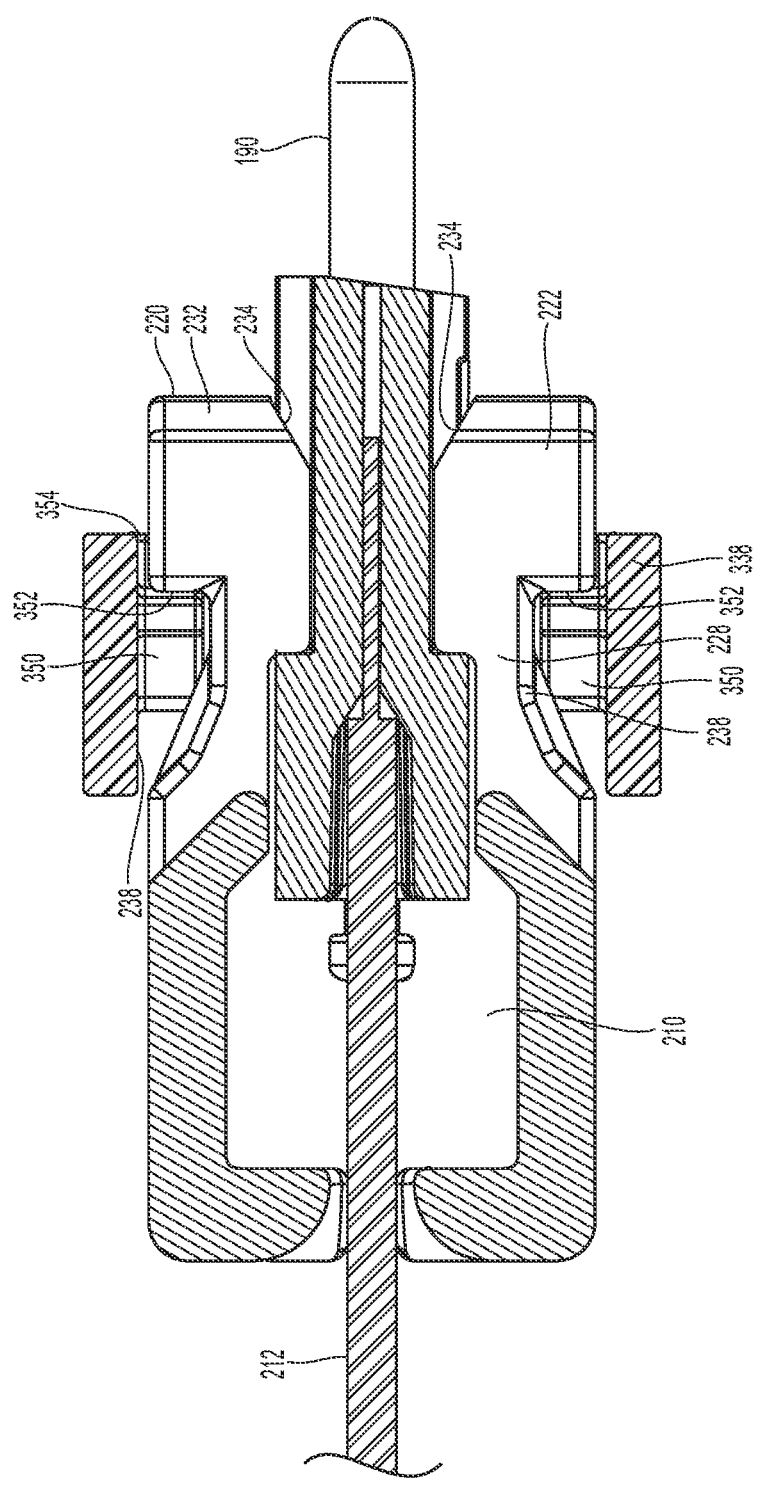
FIG. 25 is a cross-sectional view of the fiber optic ferrule and the fiber optic ferrule holder in FIG. 20.
Figure 26:
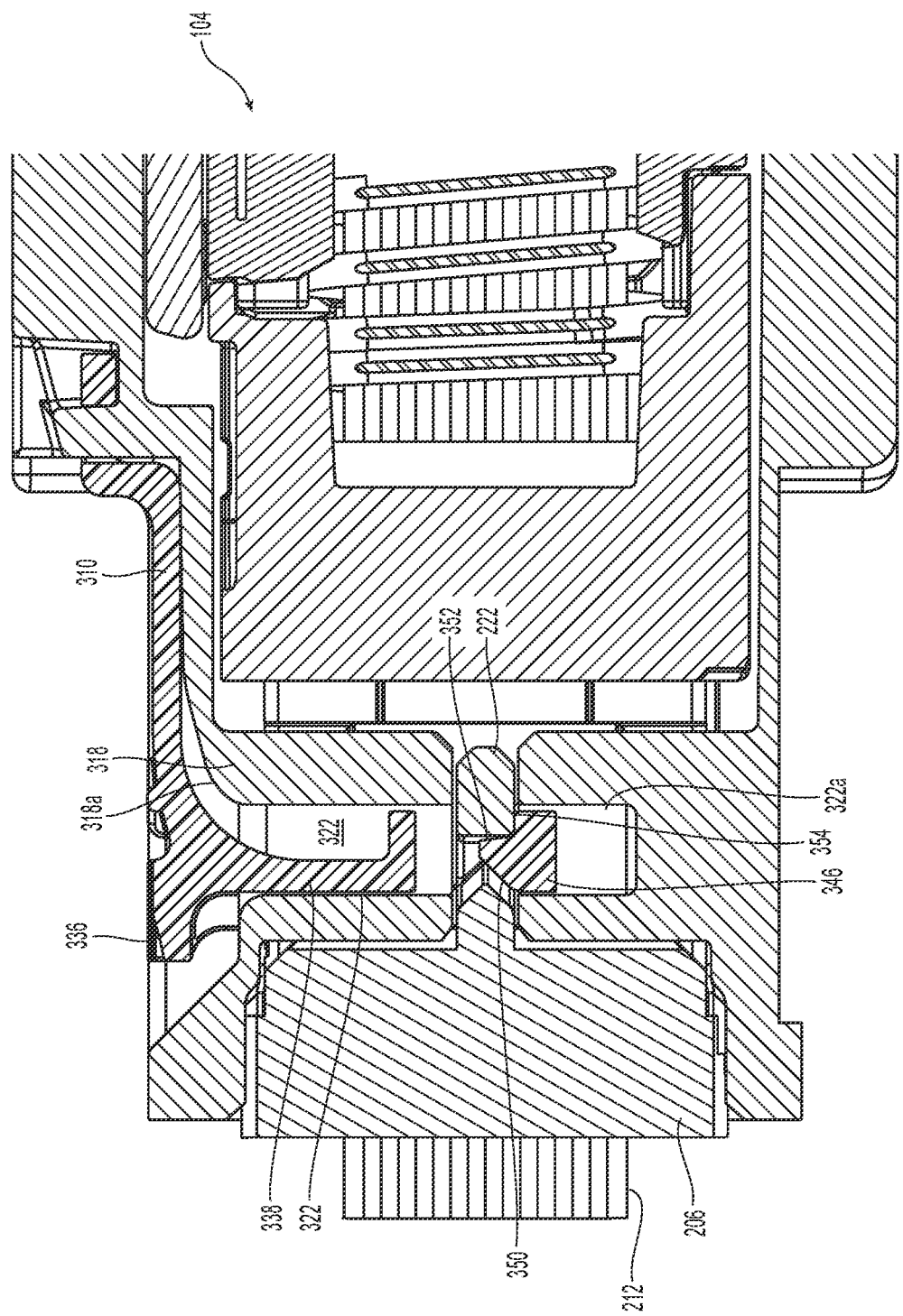
FIG. 26 is a cross-sectional view through the adapter as well as the fiber optic connector and the bare fiber optic ferrule in FIG. 1.
Figure 27:
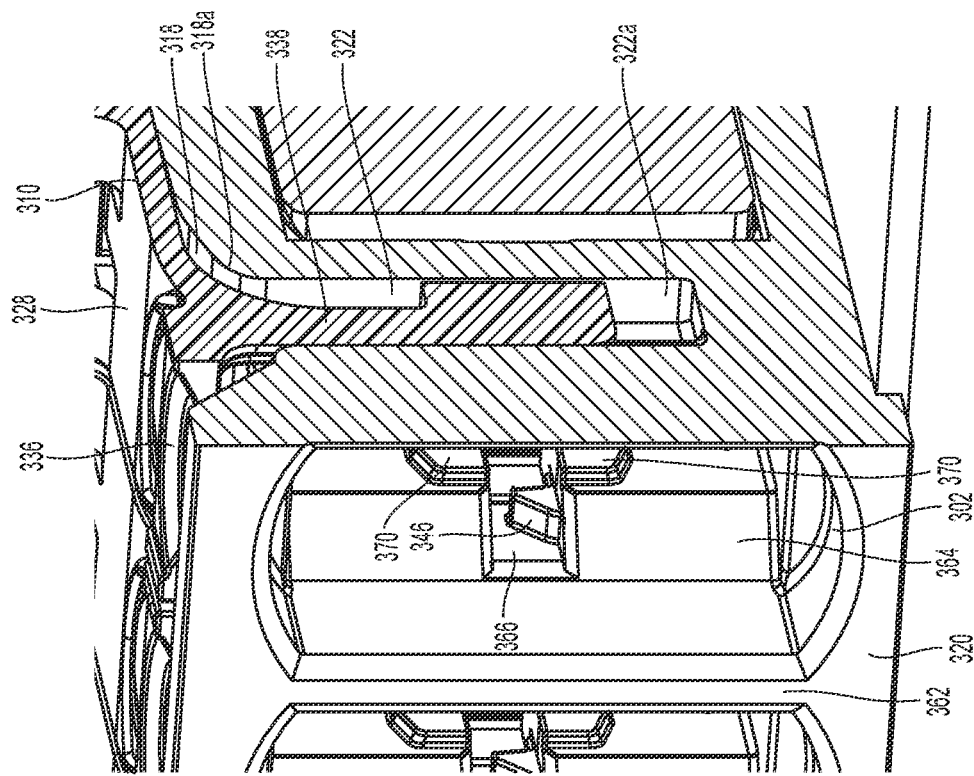
FIG. 27 is a cross section of a portion of the adapter showing the trigger legs in the columns.
Figure 28:
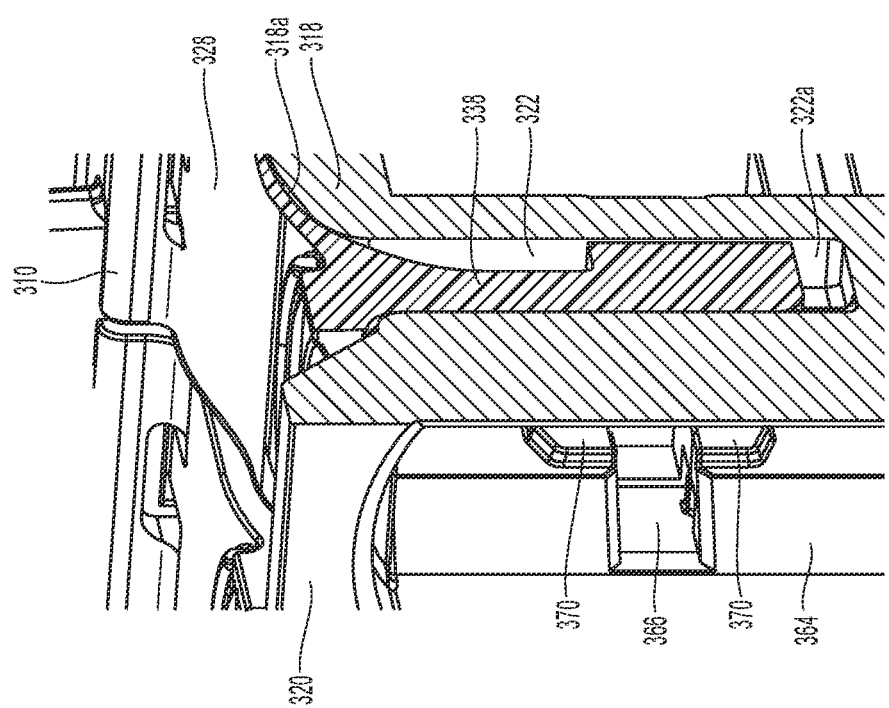
FIG. 28 is a cross section of the portion of the adapter in FIG. 23, but with the trigger legs farther in the leg space of the columns.
Figure 29:
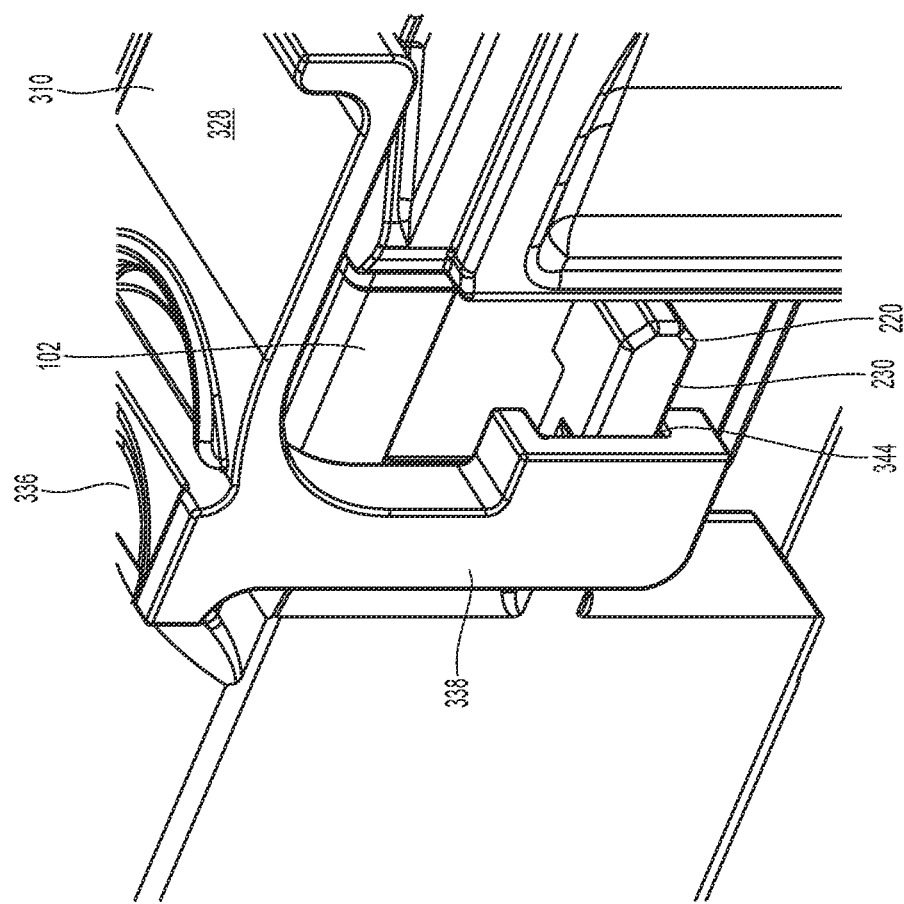
FIG. 29 is a perspective view of the trigger leg engaging the fiber optic ferrule holder.
Figure 30:
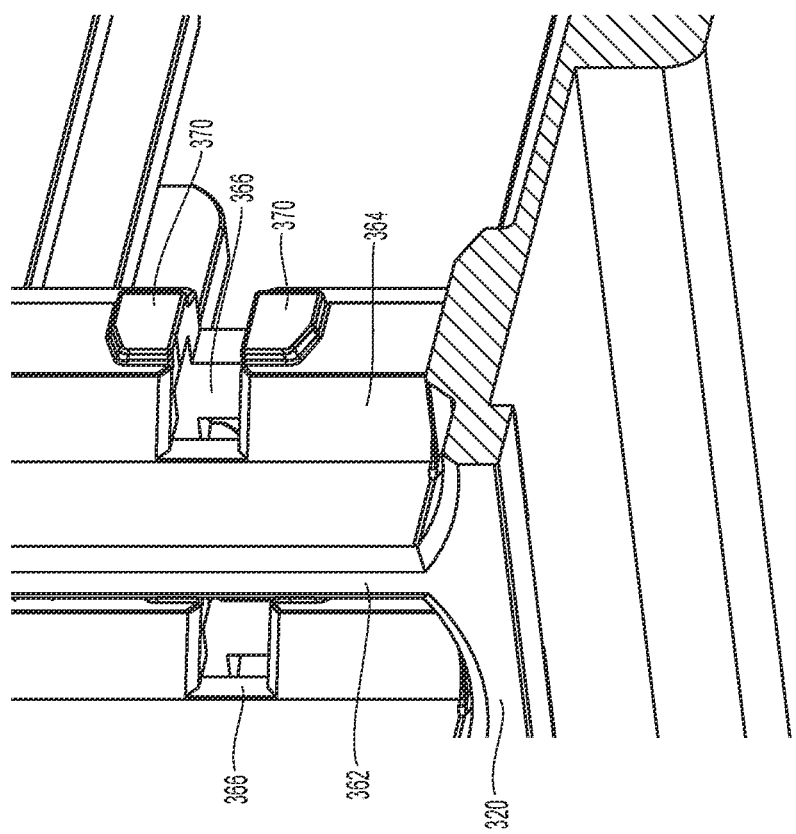
FIG. 30 is a cross section view of a portion of the adapter from the ferrule side.

The triggers 310 are further illustrated in FIGS. 19 and 20. The triggers 310 have a tab 324 that are inserted into the tab receptacles 314 of the adapter 100. Below the tab 324 is a lock latch 326 that extends from a flat body 328 of the trigger 310. The lock latch 326 is inserted into a lock receptacle 330 below the tab receptacles 314 of the adapter 100. See FIGS. 21 and 21A. The combination of the tab 324 and the lock latch 326 keep the triggers 310 from inadvertently disassociating from the adapter 100. The triggers 310 also have a trigger pad 336 that is used by an operator to release the fiber optic ferrules 102 from the adapter 100 when the time is right. Note that the trigger pad 336 is above the trigger support area 318 and the curved surface 318a in particular and the triggers 310 are flexible. Thus, with the tab 324 and the lock latch 326 secured to the adapter 100, pushing on the trigger pad 336 causes the trigger 310 to elastically bend around the curved surface 318a. As a result, the trigger legs 338,340 move relative to the adapter 100. The movement of the trigger legs 338,340 causes the adapter 100 to either engage or disengage the fiber optic ferrule holder 106. At the end of each of the trigger legs 338,340 are two inward structures. The first is an L-shaped projection 344 that provides stiffness to the trigger legs 338, 340. The L-shaped projections 344 also interact with the adapter 100 to assist in keeping the fiber optic ferrule 102 in position when mated with a fiber optic connector 104. The second structure 346 has a trigger ramp 350, a head stop surface 352, and a vertical stop surface 354. The trigger ramp 350, as discussed in more detail below, makes contact with the head portion 230 of the holder extensions 220,222 as the fiber optic ferrule 102 is inserted into the adapter 100. See FIGS. 32 and 33. The head stop surface 352 engages a ramp stop surface 236 on the back of the head portion 230. See FIGS. 24 and 25. As a result, the fiber optic ferrule holder 106 is prevented from moving backward out of the adapter 100. The second structure 346 and the vertical stop surface 354 are biased upward (due to the bending of the triggers 310) and causes the trigger legs 338,340 to maintain contact with the holder extensions 220,222 and secure the fiber optic ferrule 102 within the adapter 100. See FIGS. 25 and 29.

It should be noted that any mating force (with a fiber optic connector 104 for example) on the fiber optic ferrule 102 is transmitted to fiber optic ferrule holder 106, which in turn is transferred to the trigger legs 338,340 and the L-shaped projection 344, which then engages the adapter 100. See FIGS. 24 and 25.

The trigger legs 338,340 are inserted into the trigger receptacle openings 322 in columns 360, which are on each side of the ferrule-side openings 302. See FIGS. 21A and 22. The columns preferably extend from the top to the bottom of the adapter 100. Preferably, there is a partition 362 that is associated with each of the columns 360. The partitions 362 are illustrated as being integral with the columns 360. However, the partitions 362 could be completely or only partially separate from the columns 360. The partitions 362 provide a larger opening into the ferrule-side openings 302. The size of the ferrule-side openings 302 is reduced by a chamfered surface 364 to guide the fiber optic ferrules 102 into the ferrule-side openings 302. The chamfered surface 364 is provided on each of the columns 360 on opposing sides thereof. Thus, there are two sets of the chamfered surface 364 within each of the ferrule side openings 302. As will be appreciated, since the trigger legs 338,340 are inserted into the trigger receptacle openings 322 and are positioned on each side of the fiber optic ferrule 102, trigger legs 338,340 from adjacent triggers 310 are in the same trigger receptacle opening 322 in each column 360. See, e.g., FIG. 23.

Each of the columns 360 have at least one holder extension groove 366 that extends longitudinally between the ferrule side 304 and the connector side 308 and allows for the second structure 346 (with the trigger ramp 350, head stop surface 352, and vertical stop surface 354) to have access to the ferrule-side openings 302 from the trigger receptacle openings 322. See, e.g., FIGS. 21A, 22, 23, 27, 28, and 30. Since a holder extension groove 366 is needed on each side of the ferrule-side openings 302, there are two of the holder extension grooves 366 in each of the columns 360 in the middle of the adapter 100, but only one on those at the edges. See FIGS. 17, 18, and 22.

Figure 17:
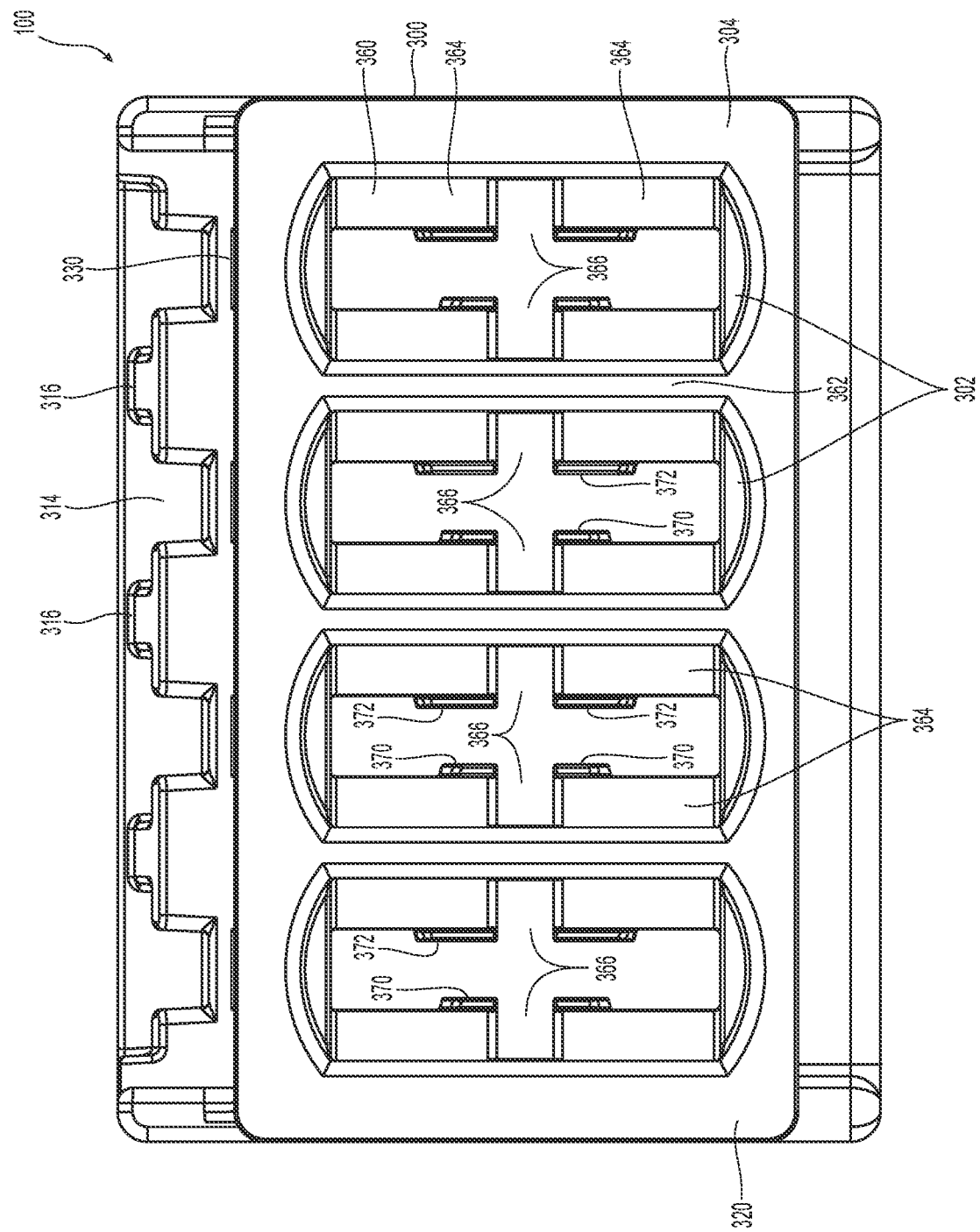
FIG. 17 is a front elevation view of the adapter from the ferrule side.
Figure 18:
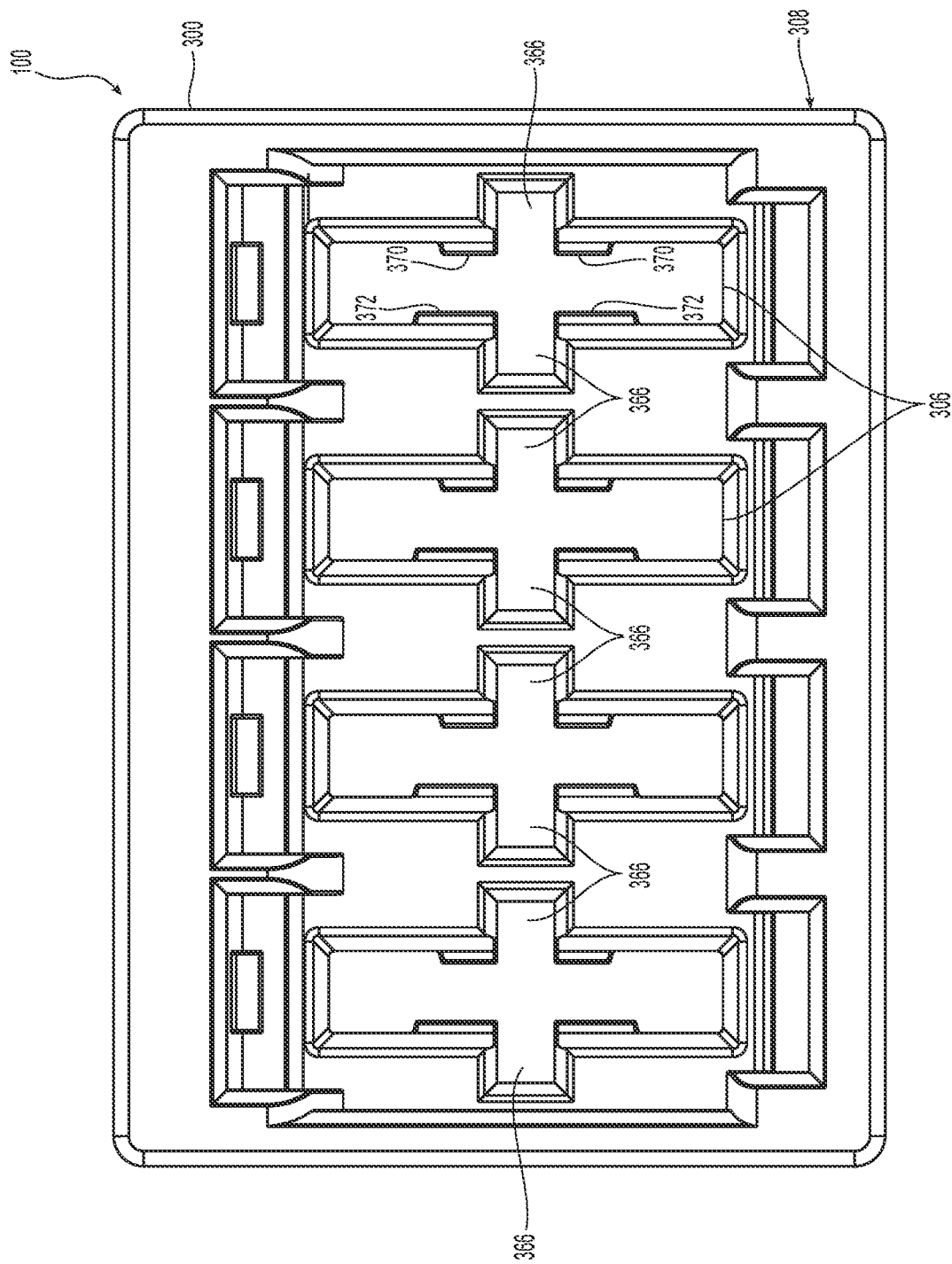
FIG. 18 is a front elevation view of the adapter from the fiber optic connector side.

On each of the columns 360 and on either side of the holder extension grooves 366 are ferrule stop pedestals 370,372. See FIGS. 17-23. The ferrule stop pedestals 370, 372 are configured to fit within the cut-outs 150,175 and the fiber optic ferrule 102. Additionally, the ferrule stop pedestals 370,372 are shaped to engage the surfaces 152,154 of the top cut-out 150 and surfaces 172 of the bottom cut-out 170 of the fiber optic ferrule 102. However, the ferrule stop pedestals 370,372 may be of different sizes and shapes. For example, as is seen in FIG. 17, the ferrule stop pedestals 370 are different from the ferrule stop pedestals 372. In this case, the sizes of the ferrule stop pedestals 370,372 mimic the sizes of the cut-outs 150,170 in the fiber optic ferrule 102, which are different on the different sides thereof. Thus, the ferrule stop pedestals 370,372 may also provide a keying feature since the fiber optic ferrules 102 will only fit within the adapter 100 in one orientation. These structures not only help to align the fiber optic ferrule 102 within the adapter 100, but as discussed below also assist with the engagement of the fiber optic ferrule 102 with the fiber optic connector 104 during mating.

Figure 14:
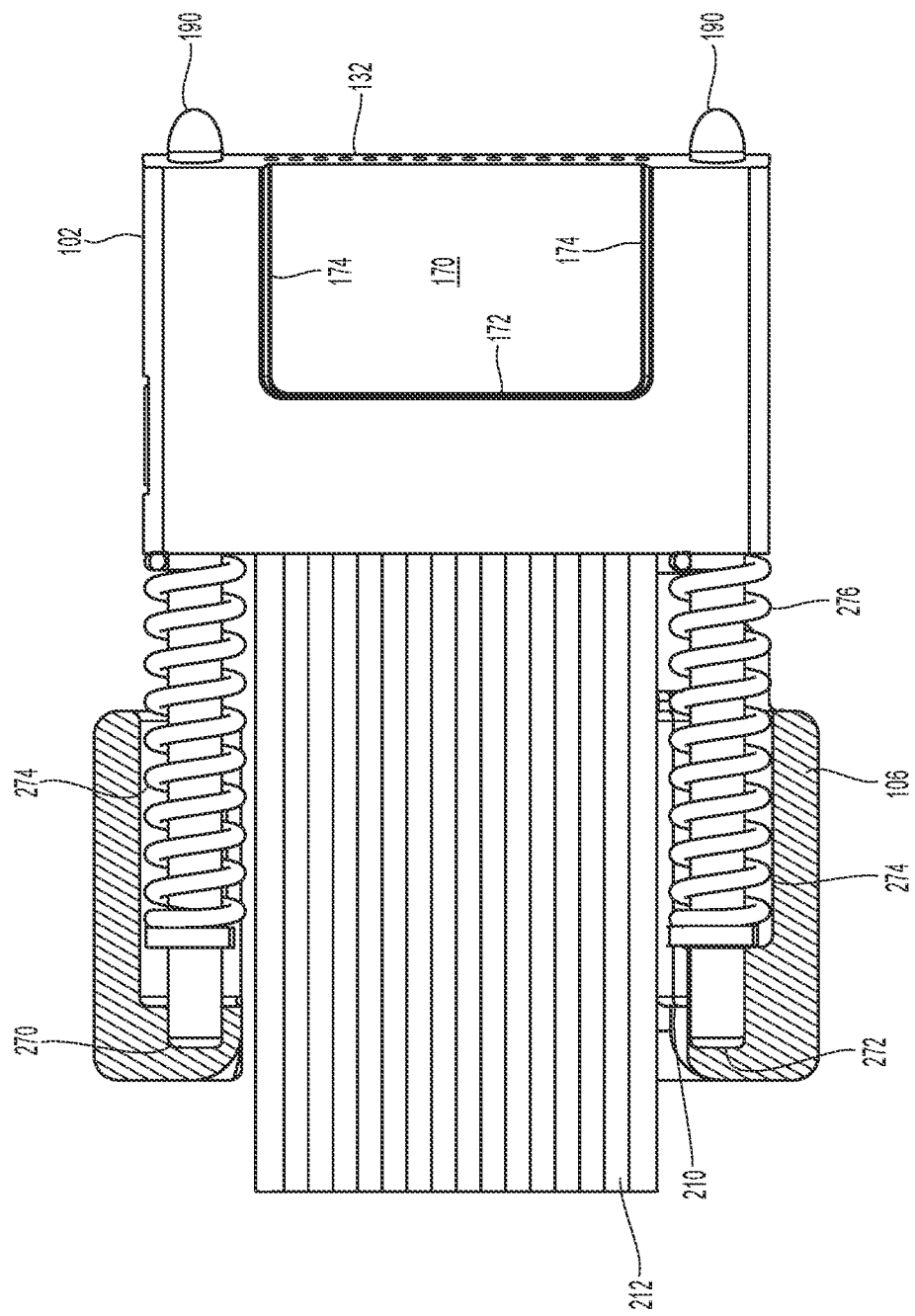
FIG. 14 is a bottom plan view of the fiber optic ferrule and the fiber optic ferrule holder before being inserted into the adapter.
Figure 15:
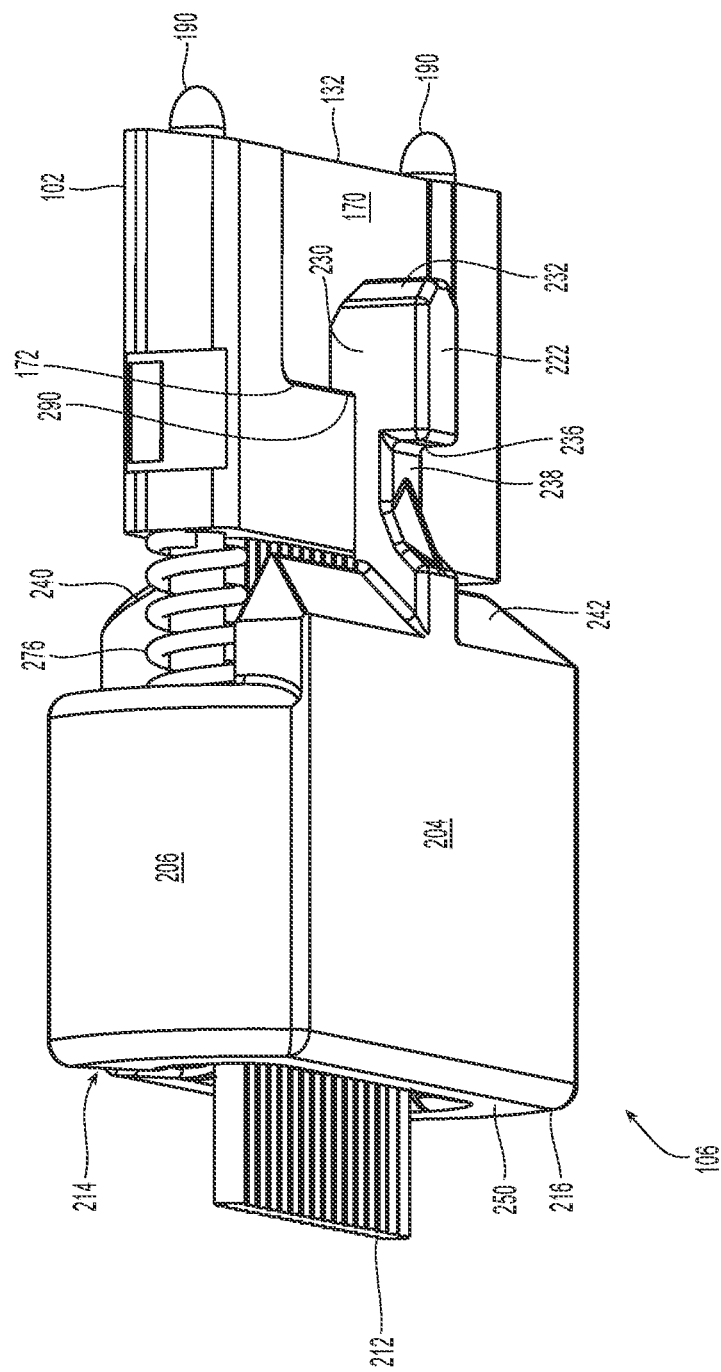
FIG. 15 is a perspective view of the fiber optic ferrule and the fiber optic ferrule holder of FIG. 14.
Figure 31:
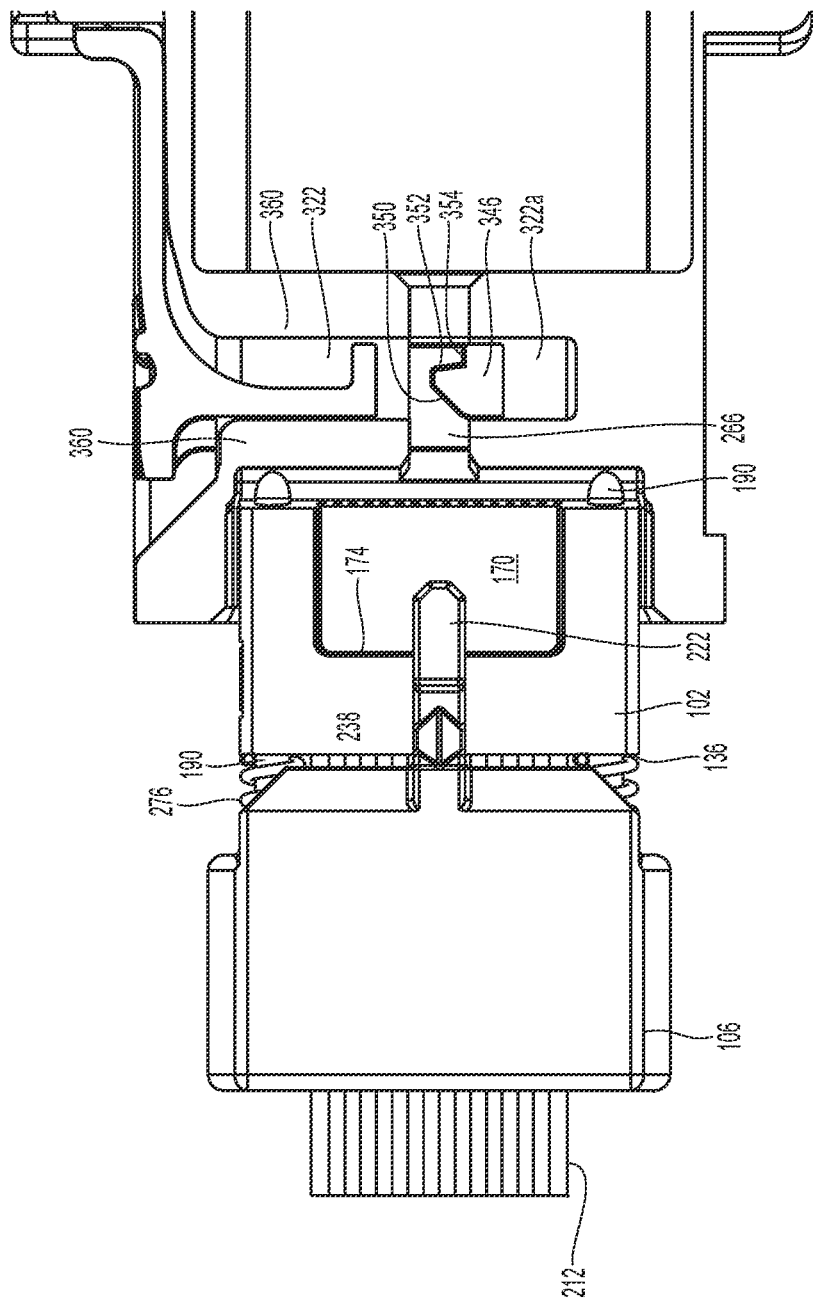
FIG. 31 is a side plan view of a cross section of the adapter showing the fiber optic ferrule and the fiber optic ferrule holder as they are just being inserted into the adapter.
Figure 32:
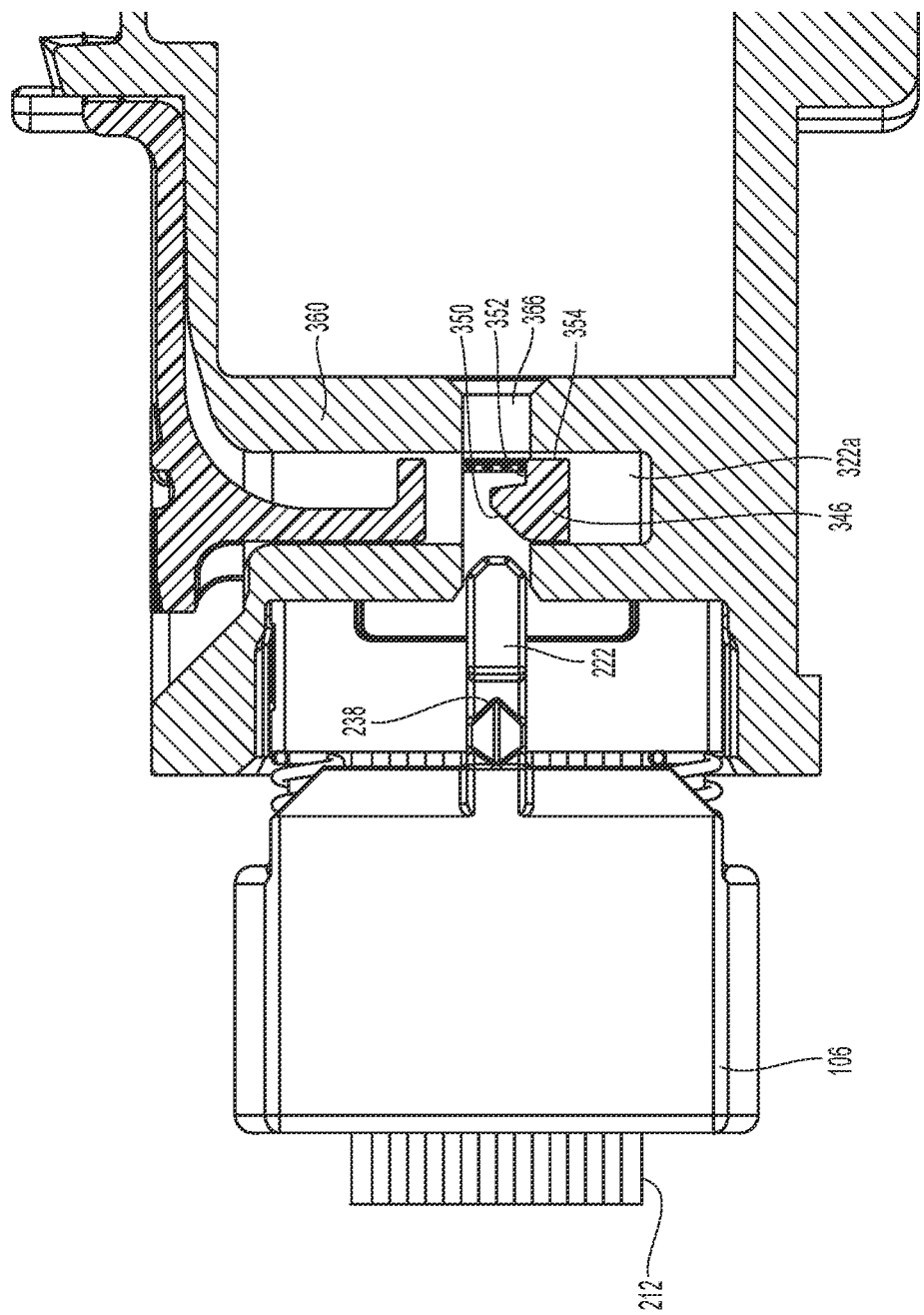
FIG. 32 is a side plan view of a cross section of the adapter showing the fiber optic ferrule and the fiber optic ferrule holder partially inserted into the adapter.
Figure 33:
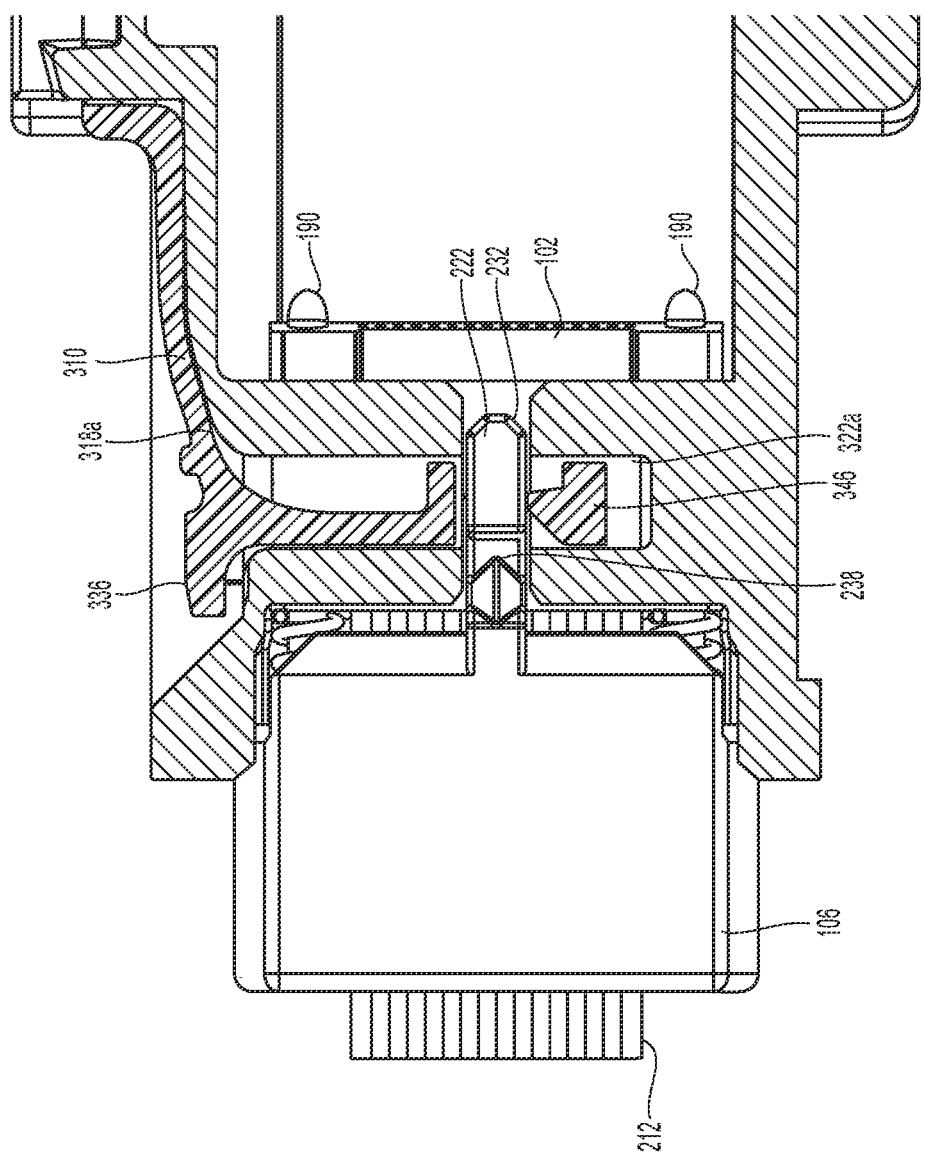
FIG. 33 is a side plan view of a cross section of the adapter showing the fiber optic ferrule partially inserted into the adapter and the fiber optic ferrule holder and guide pins only partially inserted into the adapter.
Figure 34:
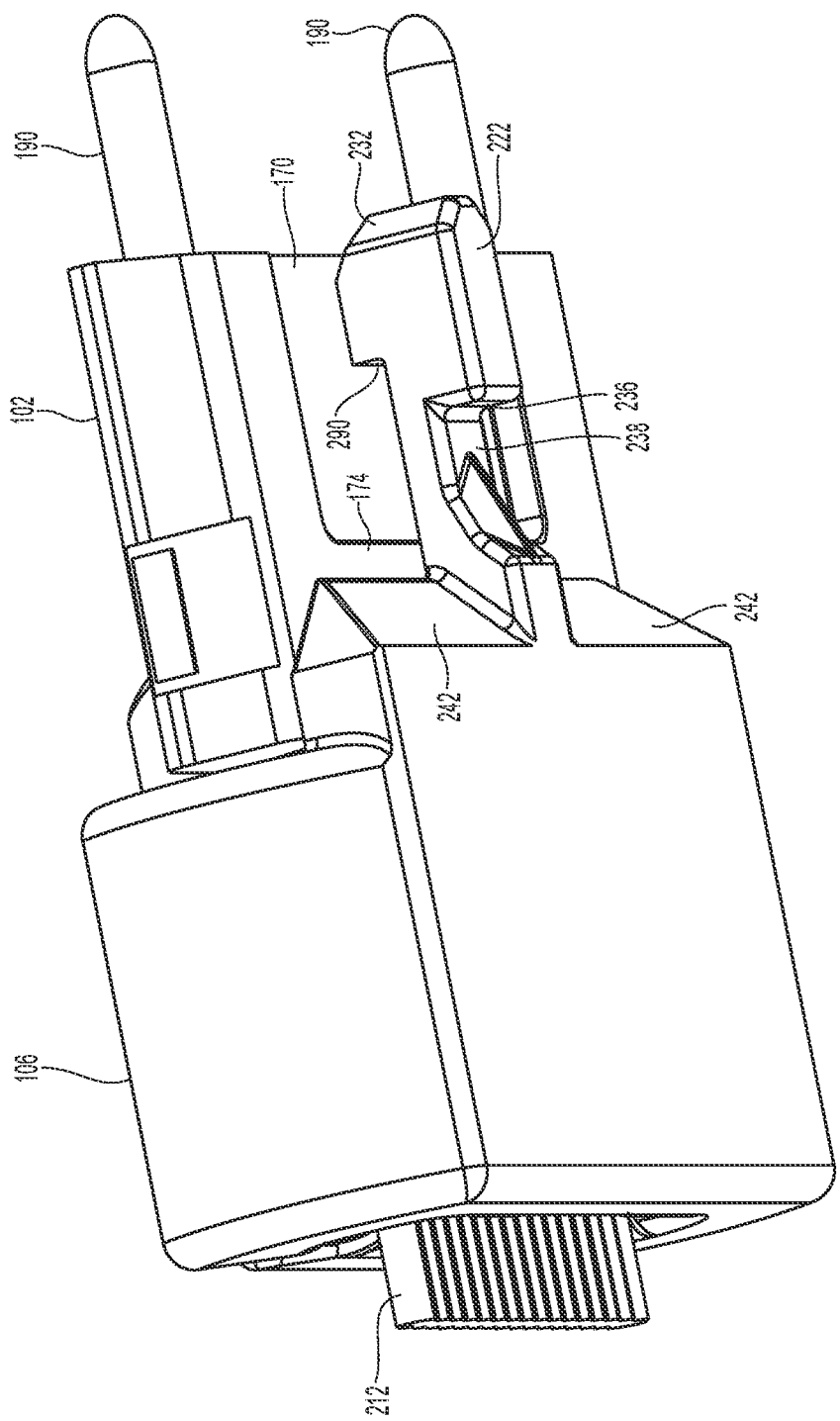
FIG. 34 is a perspective view of the fiber optic ferrule and the fiber optic ferrule holder (without the adapter) and the fiber optic ferrule holder fully engaged with the fiber optic ferrule.
Figure 35:
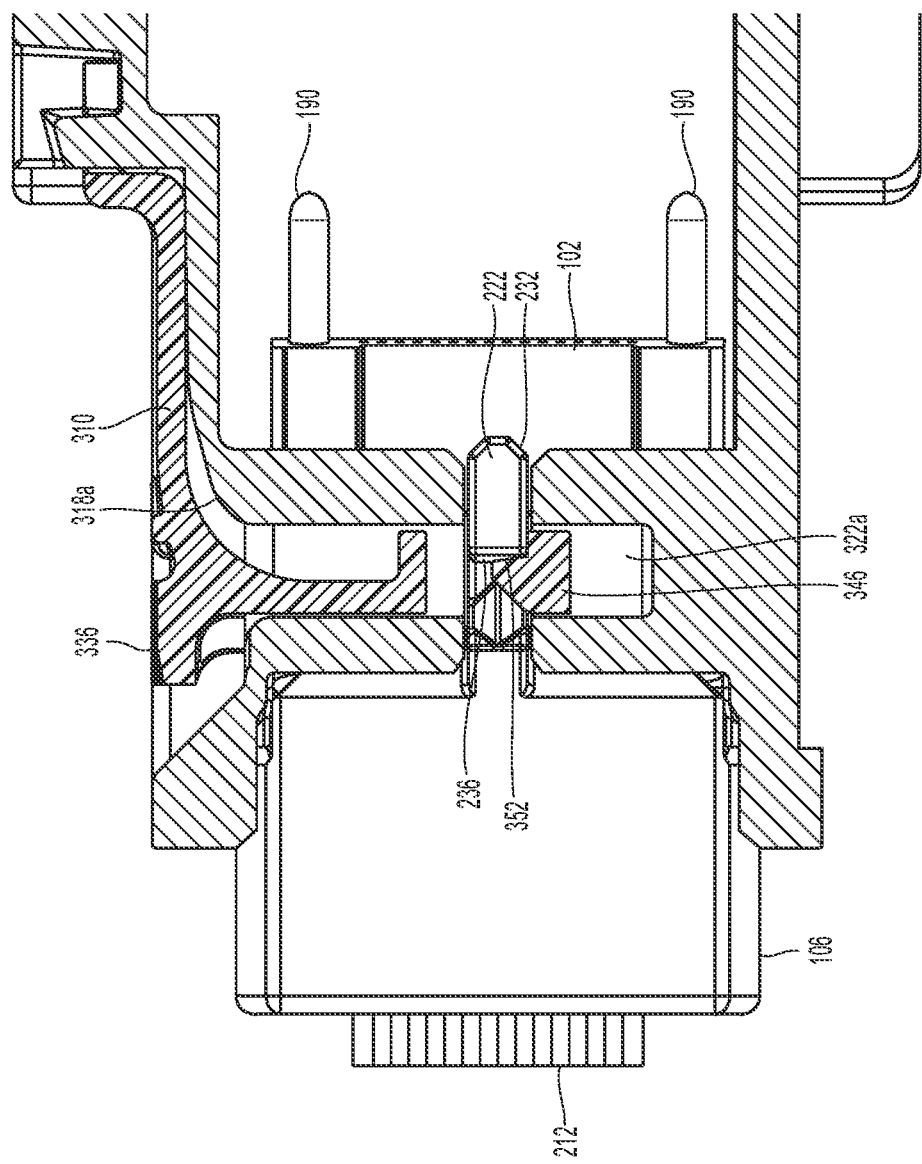
FIG. 35 is a side plan view of a cross section of the adapter showing the fiber optic ferrule and the fiber optic ferrule holder both fully inserted into the adapter.

Now that all of the components have been discussed in detail, the insertion and/or removal of the fiber optic ferrule 102 and the fiber optic ferrule holder 106 in relation to the adapter 100 will be described. The initial condition of the fiber optic ferrule 102 and the fiber optic ferrule holder 106 are illustrated in FIGS. 14 and 15. The fiber optic ferrule holder 106 has the guide pins 190 seated in the two guide pins stops 270,272. The spring 276 around each of the guide pins 190 are in a generally relaxed state. Each spring 276 is positioned rearward or behind the rear face 136 of the bare fiber optic ferrule 102. If the fiber optic ferrule holder 106 is moved forward relative to the fiber optic ferrule 102, the guide pins 190 begin to emerge from the fiber optic ferrule 102 and the springs 276 begin to compress due to that relative motion. See FIGS. 11 and 14. As the fiber optic ferrule holder 106 advances, the rear facing stop surfaces 290 engage the forward facing surfaces (ferrule stop surfaces) 152,172 of the fiber optic ferrule 102. See FIG. 31. In FIG. 31, the fiber optic ferrule 102 is moving into the ferrule-side openings 302 on a ferrule side 304 of the adapter. FIG. 32 shows the next step as the combination of the fiber optic ferrule 102 and the fiber optic ferrule holder 106 moves farther into the adapter 100. The head portion 230 of the holder extension 222 is moving into the holder extension groove 366 (on both sides of the fiber optic ferrule 102). However, the holder extensions 220,222 have not yet encountered trigger ramp 350, head stop surface 352, and vertical stop surface 354. FIG. 33 shows the engagement of the holder extension 222 with the trigger ramp 350. That engagement causes the trigger 310 to bend and the trigger legs 338,340 (which carries the second structure 346) to move downward towards the bottom 322a of the trigger receptacle opening 322. The movement of the trigger legs 338,340 occurs due to a downward pulling force on the second structure 346 as the engagement of the holder extensions 220,222 occurs with the trigger ramp 350 (which is the initial point of contact with the head portion 230). The bare fiber optic ferrule 102 is advanced toward the connector side 308. At this point in the insertion, the fiber optic ferrule 102 has begun to encounter the ferrule stop pedestals 370,372 inside the adapter 100. This provides extra stability and positioning for the smaller fiber optic ferrule 102 within the adapter 100 and relative to the fiber optic connector 104. It also causes the fiber optic ferrule 102 to stop moving forward, but the fiber optic ferrule holder 106 continues to move and the guide pins 190 start to emerge more from the fiber optic ferrule 102 (away from the end face 132). See FIGS. 34 and 35. As the guide pins 190 start to emerge even more from the fiber optic ferrule 102 as a result of the fiber optic ferrule holder 106 moving relative to the fiber optic ferrule 102, the springs 276 become more and more compressed.

Figure 36:
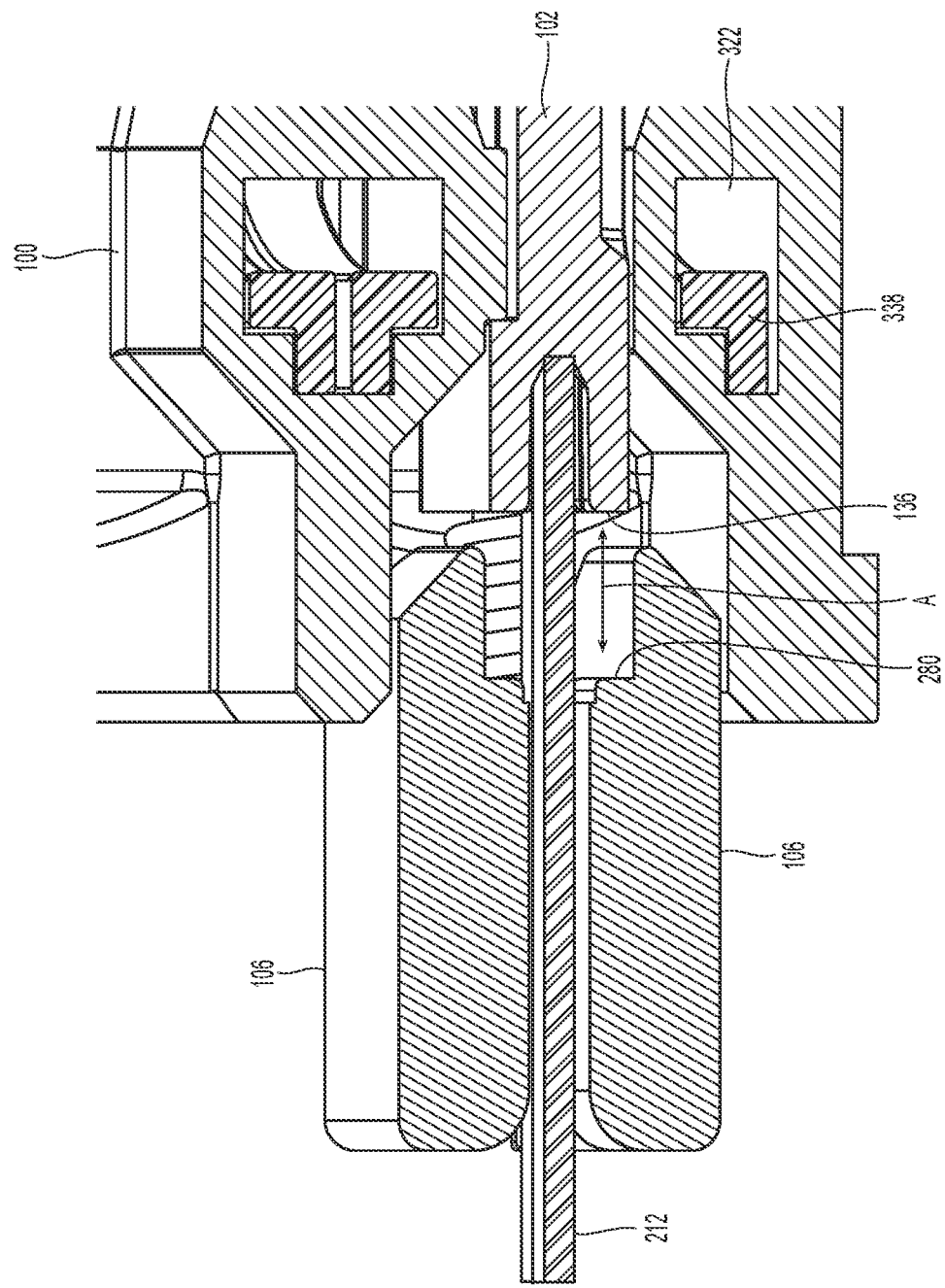
FIG. 36 is partial cross section of the fiber optic ferrule and the fiber optic ferrule holder fully inserted and a gap between the fiber optic ferrule and the fiber optic ferrule holder.

At this point, the head stop surface 352 of the trigger legs 338,340 engages the ramp stop surface 236 on the back of the head portion 230 of the respective holder extensions 220,222. See also FIGS. 13, 19, 24, 25, and 29. There is also a small amount of float (gap) of the fiber optic ferrule 102 within the fiber optic ferrule holder 106. As illustrated in FIG. 36, the gap is illustrated as an arrow A between the rear face 136 of the fiber optic ferrule 102 and the float stops 280.

Figure 37:
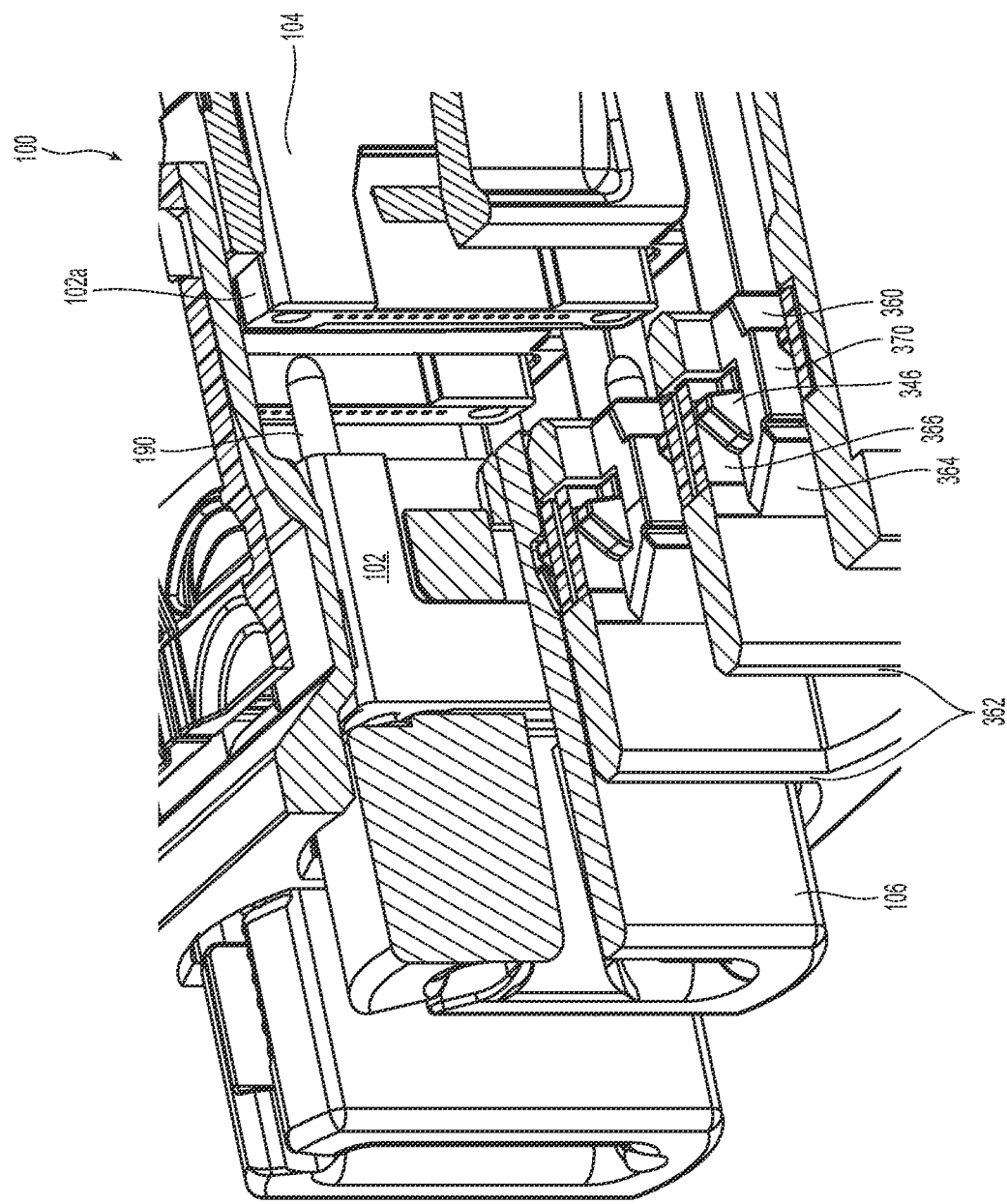
FIG. 37 is a cross section of the adapter, the fiber optic ferrule, and the fiber optic ferrule holder with the fiber optic connector being inserted with the fiber optic ferrule and the fiber optic ferrule holder already seated in the adapter.
Figure 38:
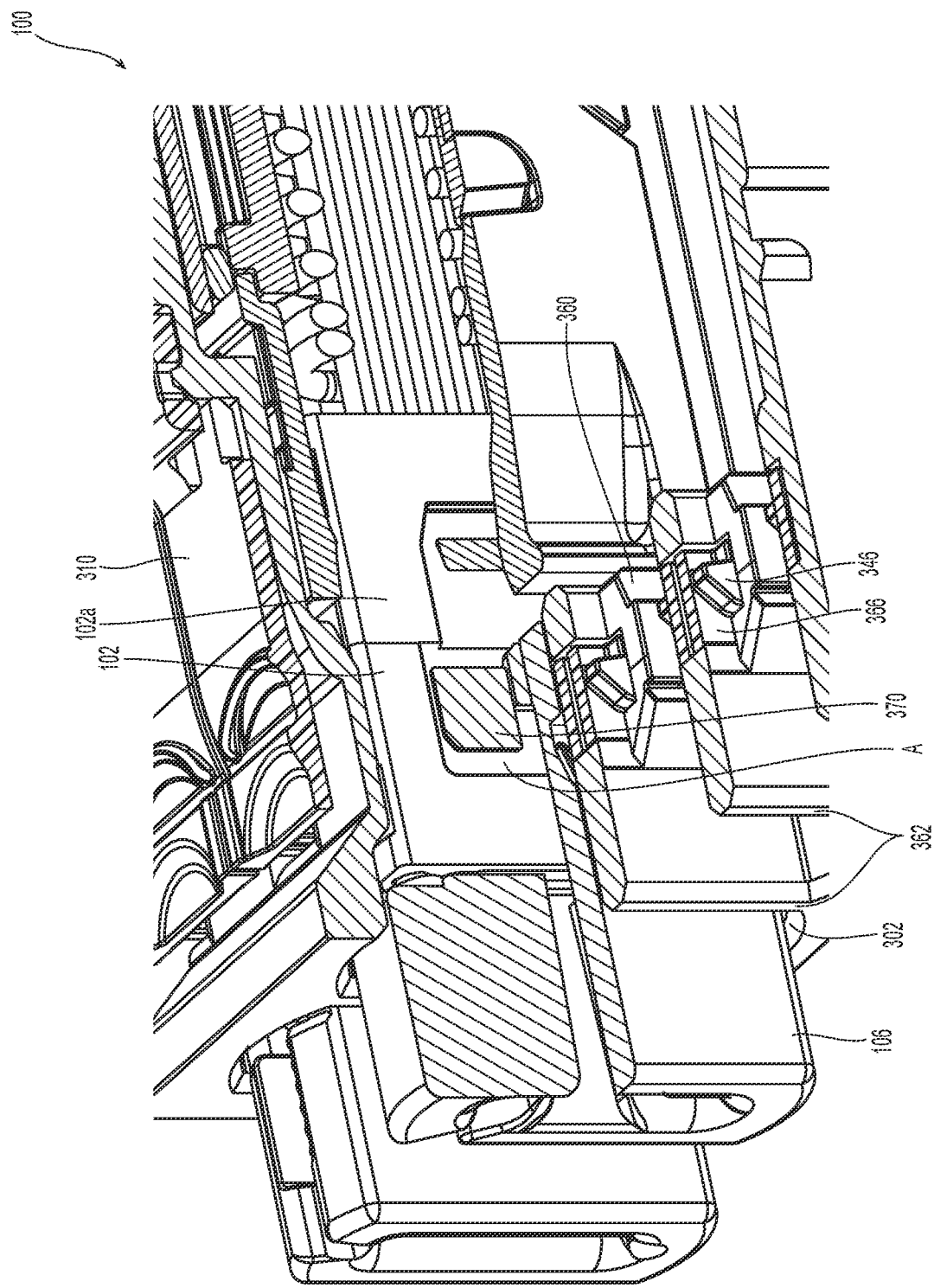
FIG. 38 is cross section of the adapter, the fiber optic ferrule, and the fiber optic ferrule holder with the fiber optic connector engaging and slightly moving the fiber optic ferrule and the fiber optic ferrule holder to the right.

FIGS. 37-38 illustrate the situation where a bare fiber optic ferrule 102 with a fiber optic ferrule holder 106 is already seated in the adapter 100, and subsequently mates with the fiber optic ferrule 102 from the fiber optic connector 104. The bare fiber optic ferrule 102 is engaged with the ferrule stop pedestals 370,372 and the head stop surface 352 is engaged with the ramp stop surface 236. See FIG. 35. When the fiber optic ferrule 102a from the fiber optic connector 104 makes contact with the bare fiber optic ferrule 102, the bare fiber optic ferrule 102 moves rearwardly with respect to the adapter 100 and the fiber optic ferrule holder 106—closing the gap between the rear face 136 of the bare fiber optic ferrule 102 and the float stops 280. The bare fiber optic ferrule 102 also moves rearwardly from the ferrule stop pedestals 370,372. The fiber optic ferrule holder 106 does not move due to the engagement of the head stop surface 352 and the ramp stop surface 236. This situation allows for increased mating forces of up to about 20N.

Figure 39:
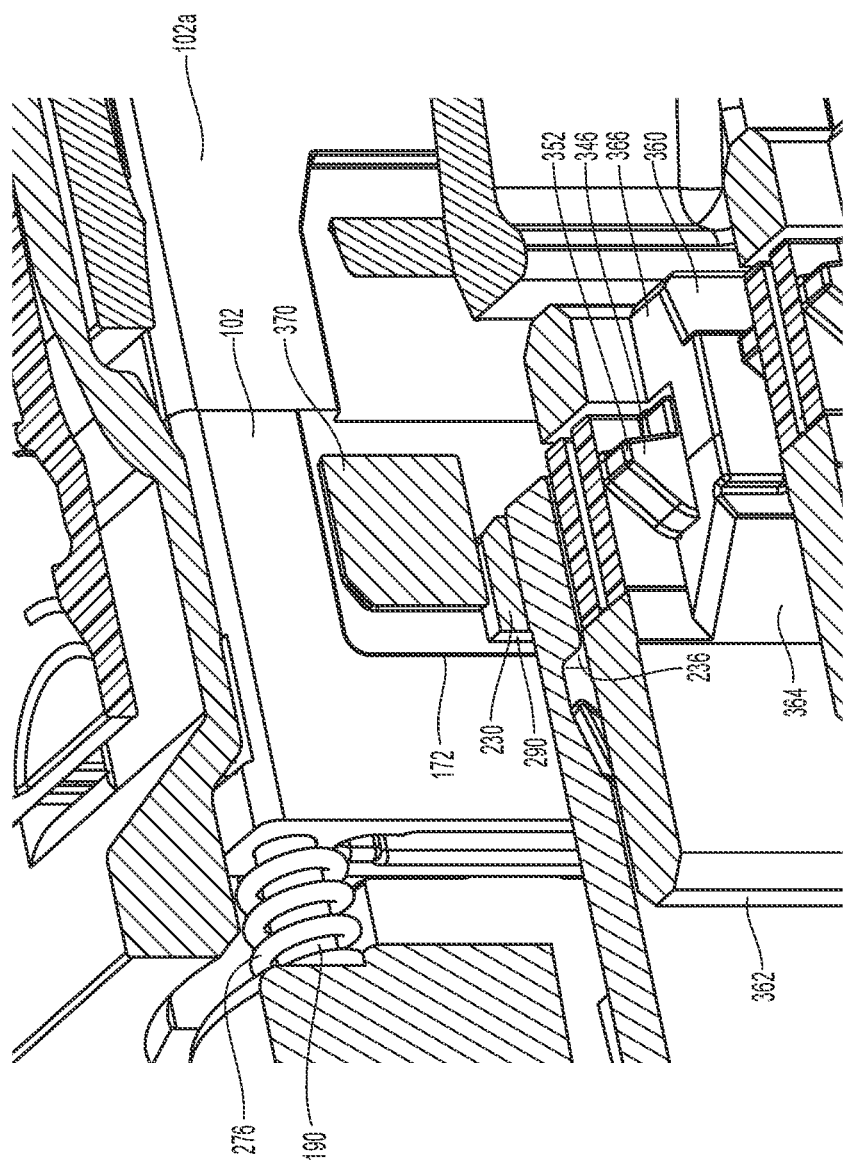
FIG. 39 is a perspective view of the cross section of the adapter, the fiber optic ferrule, and the fiber optic ferrule holder with the fiber optic ferrule holder being removed from the adapter after the trigger has been activated to release the fiber optic ferrule holder.
Figure 40:
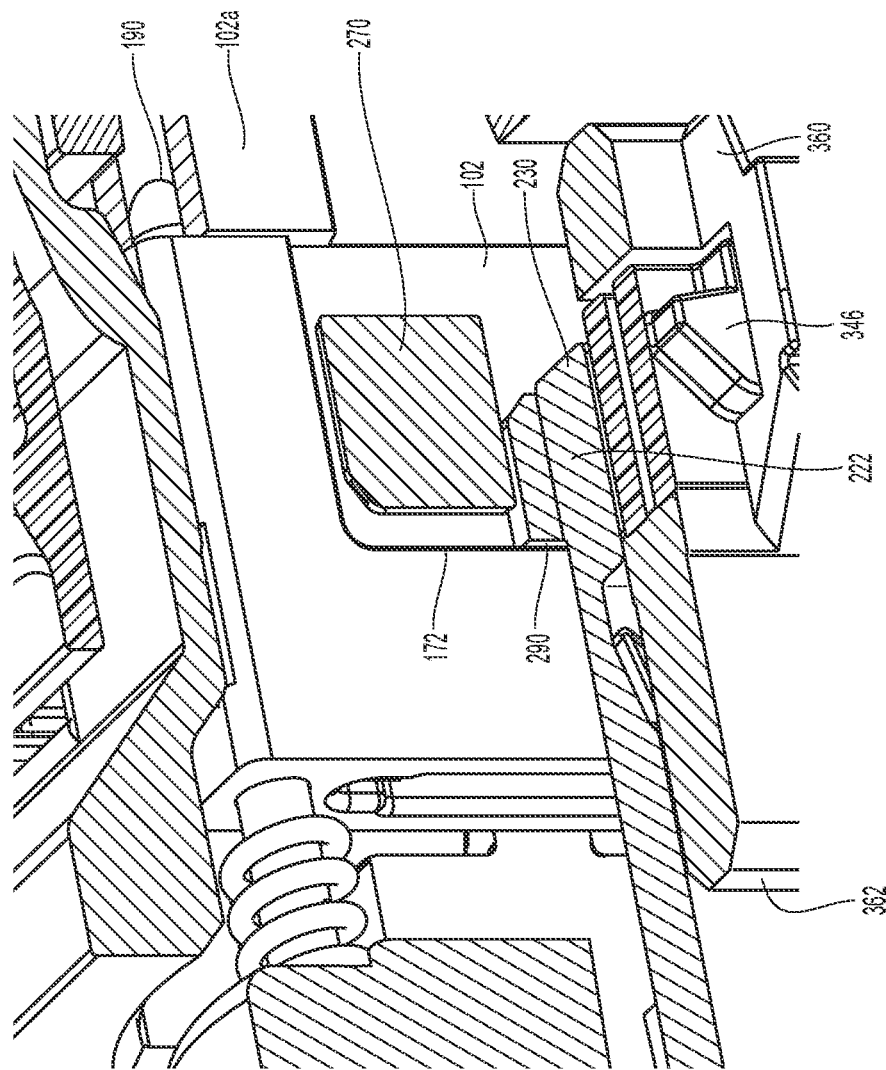
FIG. 40 illustrates that as the fiber optic ferrule holder is removed, the guide pins are retracted and the fiber optic ferrule holder begins to pull on the fiber optic ferrule.
Figure 41:
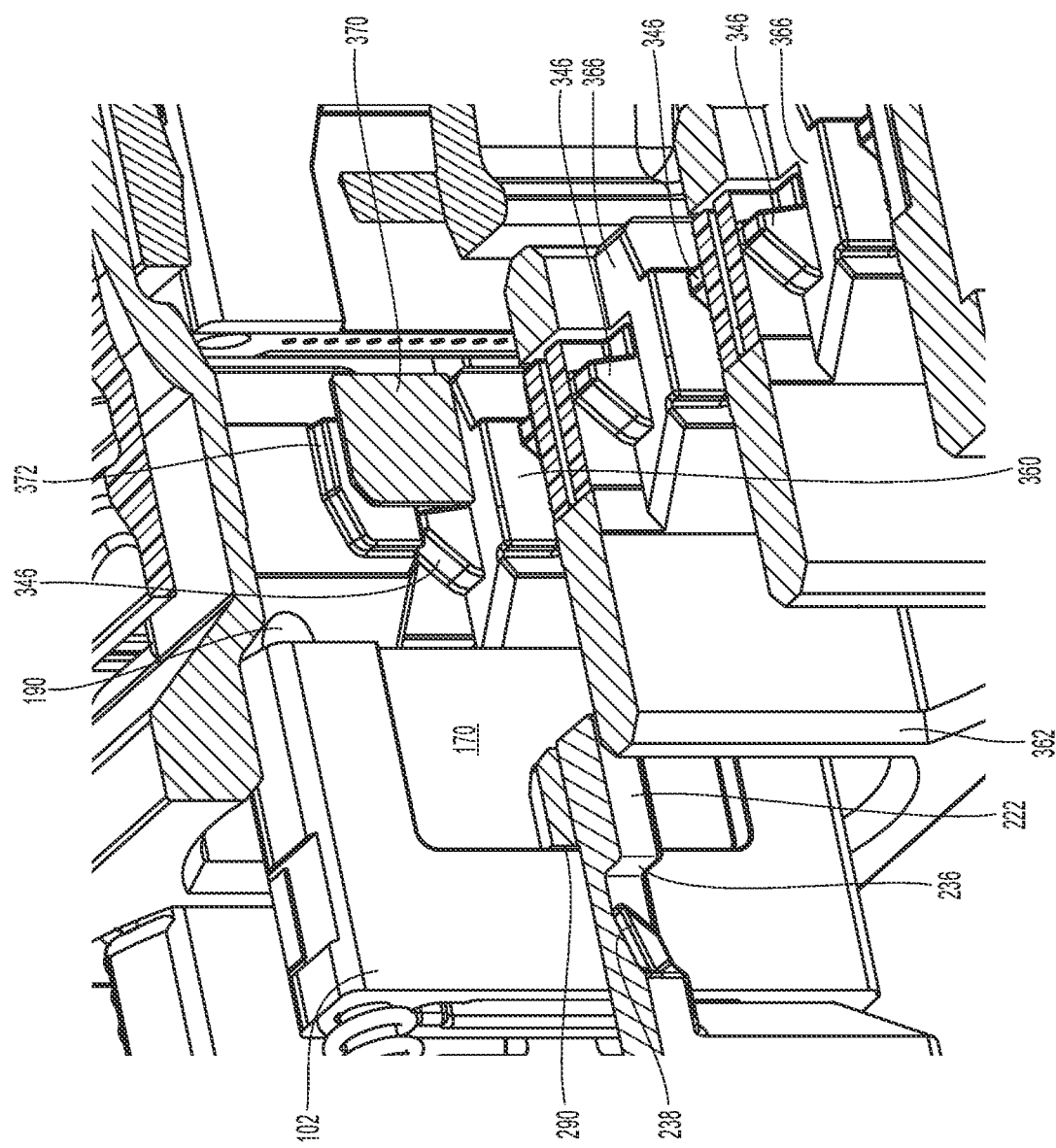
FIG. 41 illustrates that the fiber optic ferrule holder and the fiber optic ferrule are removed from the adapter or alternatively, they are being inserted into the adapter with the fiber optic connector already seated with the guide pins retracted.

FIGS. 39-41 illustrate the removal of the bare fiber optic ferrule 102 and the fiber optic ferrule holder 106 from the adapter 100. In FIG. 39, the trigger pad 336 has been pressed moving the trigger legs downward and uncoupling the ramp stop surface 236 on the back of the head portion 230 from the head stop surface 352. See also FIG. 35. Thus, the fiber optic ferrule holder 106 is now free from the adapter 100, and moves rearwardly because of the tension in the guide pin springs 276. The guide pins 190 will retract, at least partially from the fiber optic ferrule 102a in the fiber optic connector 104. Each of the rear facing stop surfaces 290 of the fiber optic ferrule holder 106 then engage the forward facing surfaces 152,172 on both sides of the fiber optic ferrule 102. See FIG. 40 for one of the two sides. It should be noted that in FIG. 40, the tip of the guide pin 190 is still disposed within the guide pin hole of the fiber optic ferrule 102a in the fiber optic connector 104. One can then pull on the fiber optic ferrule holder 106, which is still engaged to the fiber optic ferrule 102 (the forward facing surfaces or the ferrule stop surfaces 152,172) by the rear facing stop surfaces 290. FIG. 41 shows the further removal of the bare fiber optic ferrule 102 and the fiber optic ferrule holder 106 from the adapter 100. Performing the steps in reverse would also allow for the bare fiber optic ferrule 102 and the fiber optic ferrule holder 106 to be mated to the fiber optic connector 104.

Figure 42:
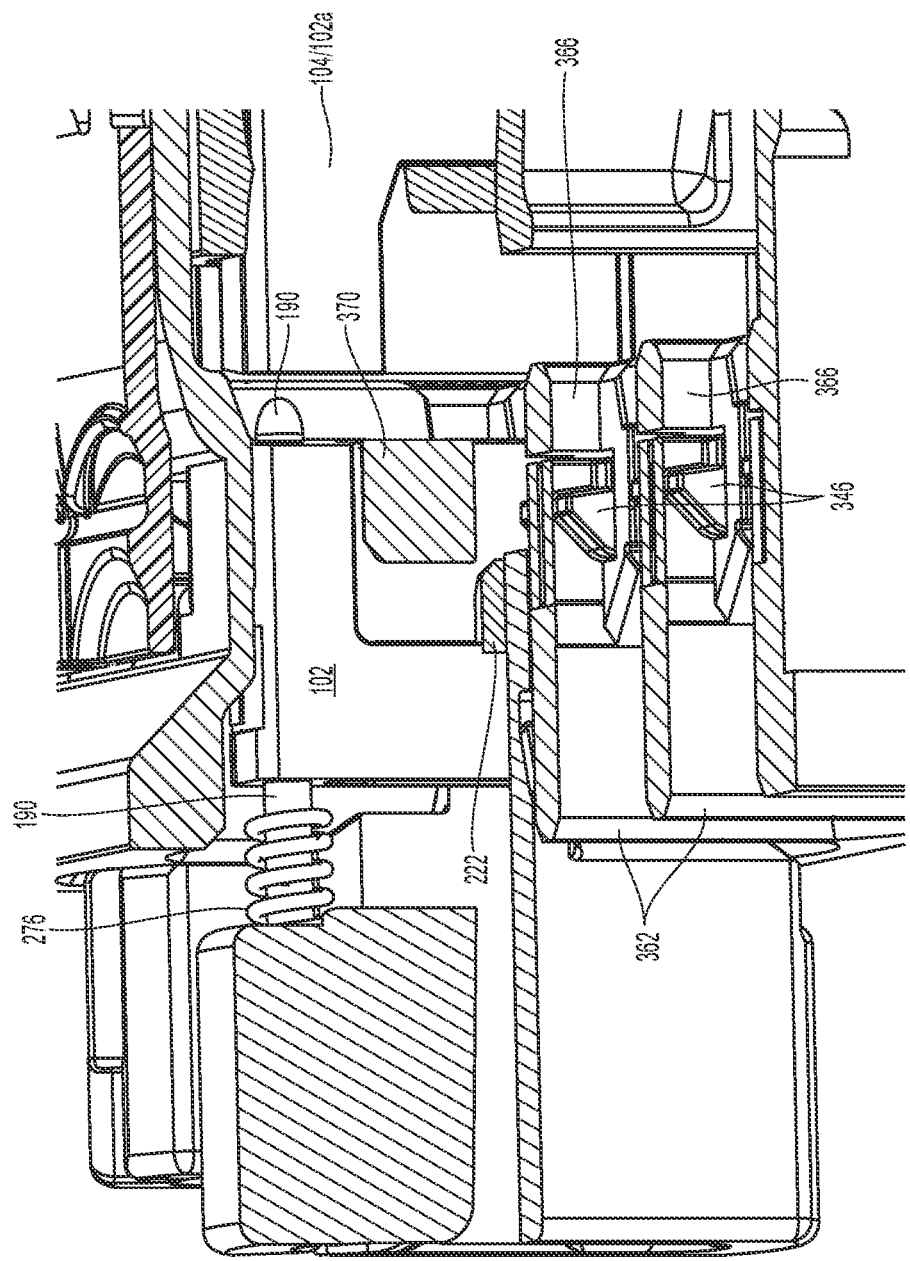
FIG. 42 shows that the fiber optic ferrule is being inserted with the fiber optic connector previously seated and there being no guide pin stubbing since the guide pins are retracted until the end of the insertion process.

FIGS. 41 and 42 can also explain the insertion of a bare fiber optic ferrule 102 and the fiber optic ferrule holder 106 into the adapter 100 when the fiber optic connector 104 is already seated in the adapter 100. In FIG. 41, the fiber optic connector 104 is seated in the adapter 100. The fiber optic ferrule 102 is coming from the left and has the guide pins 190 slightly protruding. If the guide pins 190 were fully protruding from the fiber optic ferrule 102, they would have a greater chance of stubbing against the fiber optic connector 104, for example, against the end face of the fiber optic ferrule 102a. However, as the fiber optic ferrule 102 is advanced and engages the ferrule stop pedestals 370,372, the fiber optic ferrule 102 is aligned with the fiber optic connector 104 and prevents the stubbing of the guide pins 190.

Turning to FIG. 42, it can be seen that fiber optic ferrule 102 is close to the fiber optic connector 104 and as the fiber optic ferrule holder 106 is advanced relative to the fiber optic ferrule 102, the guide pins 190 would engage the fiber optic connector 104. Even further advancement of the combination of the fiber optic ferrule 102 and the fiber optic ferrule holder 106 would cause the fiber optic ferrule holder 106 to engage the adapter and maintain the relationship with the fiber optic connector 104 to eventually be in the mated position with the fiber optic ferrule 102a, as shown for example in FIG. 39.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

We claim:

1. An adapter to mate bare fiber optic ferrules to respective fiber optic ferrules in a housing within fiber optic connectors, the adapter comprising:
    a main body having a plurality of ferrule-side openings on a ferrule side to receive the bare fiber optic ferrules and a plurality of connector-side openings on a connector side of the main body to receive the fiber optic connectors;
    a plurality of columns that extends between a top side and a bottom side of the main body, the ferrule-side openings defined by adjacent ones of the plurality of columns;
    a plurality of triggers attached to a top side of the adapter, each of the plurality of triggers having a pair of trigger legs, each trigger leg of the pair of trigger legs positioned inside respective columns on opposing sides;
    a holder extension groove oriented longitudinally in each column and configured to receive a holder extension of a fiber optic ferrule holder supporting a fiber optic ferrule; and
    a pair of ferrule stop pedestals on each column on opposite sides of each holder extension groove configured to seat the fiber optic ferrule when the fiber optic ferrule holder is fully inserted into the adapter.

2. The adapter according to claim 1, further comprising a plurality of partitions, each of the plurality of partitions associated with a respective one of the plurality of columns.

3. The adapter according to claim 2, wherein the plurality of partitions at least partially define the plurality of ferrule-side openings.

4. The adapter according to claim 1, wherein a portion of each trigger leg extends from a respective column and into a portion of the holder extension groove.

5. The adapter according to claim 1, wherein the fiber optic ferrule holder is disposed in a space between adjacent ones of the plurality of columns.

6. The adapter according to claim 1, wherein each of the trigger legs is movable within a respective column.

7. The adapter according to claim 4, wherein the portion of each of the trigger legs of the pair of trigger legs extending into the holder extension groove has a chamfered portion to engage the fiber optic ferrule holder during insertion into the adapter.

8. The adapter according to claim 4, the portion of each of the trigger legs of the pair of trigger legs extending into the holder extension groove has a forward facing stop surface to engage a rearward facing surface of the fiber optic ferrule holder once the fiber optic ferrule holder has been inserted into the adapter.

9. The adapter according to claim 1, wherein the ferrule-side openings are narrower at the columns than at an end of the adapter on the ferrule-side openings.

10. The adapter according to claim 1, wherein each trigger leg of the pair of trigger legs is positioned inside respective columns on opposing sides of each of the plurality of ferrule-side openings.

11. The adapter according to claim 1, further comprising:
    a plurality of trigger receptacle openings on the top side of the adapter to receive the pair of legs of each of the plurality of triggers, the trigger receptacle openings being in communication with respective ones of the columns.

12. The adapter according to claim 1, wherein each column includes an additional pair of ferrule stop pedestals, the additional pair of ferrule stops being in communication with a different ferrule side opening than a ferrule-side opening having the pair of ferrule stop pedestals.

13. The adapter according to claim 12, wherein the additional pair of ferrule stop pedestals have a dimension different from the pair of ferrule stop pedestals on the respective column in the plurality of columns.

14. An adapter to mate bare fiber optic ferrules to respective fiber optic ferrules in a housing within fiber optic connectors, the adapter comprising:
    a main body having a plurality of ferrule-side openings on a ferrule side to receive the bare fiber optic ferrules and a plurality of connector-side openings on a connector side of the main body to receive the fiber optic connectors;
    a plurality of partitions on the ferrule side;
    a plurality of columns associated with each of the partitions, each column in the plurality of columns extending between a top side and a bottom side of the main body, the ferrule-side openings defined by adjacent ones of the plurality of partitions and columns;

a plurality of triggers attached to a top side of the adapter, each of the plurality of triggers having a pair of trigger legs, each trigger leg of the pair of trigger legs positioned inside respective columns on opposing sides of each ferrule-side opening;

a holder extension groove oriented longitudinally in each column and configured to receive a holder extension of a fiber optic ferrule holder supporting a fiber optic ferrule; and a pair of ferrule stop pedestals on each column on opposite sides of each holder extension groove configured to seat the fiber optic ferrule when the fiber optic ferrule holder is fully inserted into the adapter.

15. The adapter according to claim 14, wherein each partition of the plurality of partitions is joined to a respective column in the plurality of columns.

\* \* \* \* \*